United States Patent
Matsugu et al.

(10) Patent No.: US 7,028,271 B2
(45) Date of Patent: Apr. 11, 2006

(54) HIERARCHICAL PROCESSING APPARATUS

(75) Inventors: Masakazu Matsugu, Ohta-ku (JP); Katsuhiko Mori, Ohta-ku (JP); Yusuke Mitarai, Ohta-ku (JP)

(73) Assignee: Canon Kabushiki Kaisha, Tokyo (JP)

( * ) Notice: Subject to any disclaimer, the term of this patent is extended or adjusted under 35 U.S.C. 154(b) by 322 days.

(21) Appl. No.: 10/702,171

(22) Filed: Nov. 4, 2003

(65) Prior Publication Data

US 2004/0103095 A1    May 27, 2004

(30) Foreign Application Priority Data

Nov. 6, 2002  (JP)  ............................ 2002-322717
Nov. 6, 2002  (JP)  ............................ 2002-322718

(51) Int. Cl.
  *G06F 17/50*   (2006.01)
  *G06K 9/00*    (2006.01)
  *G06K 9/36*    (2006.01)
  *G06K 9/46*    (2006.01)

(52) U.S. Cl. ........................ 716/1; 382/181; 382/195; 382/240

(58) Field of Classification Search .................... 716/1; 382/181, 195, 240; 707/6; 706/20
See application file for complete search history.

(56) References Cited

U.S. PATENT DOCUMENTS 5,058,184 A * 10/1991  Fukushima ................. 382/158
5,220,559 A    6/1993  Tsuzuki
5,533,148 A *  7/1996  Sayah et al. ................... 716/1
5,959,871 A    9/1999  Pierzchala
6,452,259 B1   9/2002  Akiyama
2002/0038294 A1  3/2002  Matsugu
2002/0181765 A1* 12/2002  Mori et al. .................. 382/158
2005/0185835 A1*  8/2005  Matsugu et al. ............ 382/159

FOREIGN PATENT DOCUMENTS

JP          2-064787 A        3/1990
JP          6-274459 A        9/1994
JP         11-168185 A        6/1999
JP       2000-331113 A       11/2000

* cited by examiner

*Primary Examiner*—Paul Dinh
(74) *Attorney, Agent, or Firm*—Canon U.S.A. Inc I.P. Div

(57) ABSTRACT

A hierarchical processing apparatus includes a data input unit for time-sequentially inputting pattern data in a particular hierarchical level, a calculation parameter control data memory for storing calculation parameter control data, a local area recognition module for detecting a particular feature from pattern data, using the calculation parameter control data, and an intermediate result storage module for storing an intermediate result output from the local area recognition module. Depending on the hierarchical level of processing, a flow of data is controlled such that an input acquired via the data input unit or an intermediate result fed back from the intermediate result storage module and calculation parameter control data read from the calculation parameter control data memory are supplied to the local area recognition module. The hierarchical processing apparatus can perform various kinds of complicated calculations using a simple small-scale circuit with low power consumption.

27 Claims, 24 Drawing Sheets

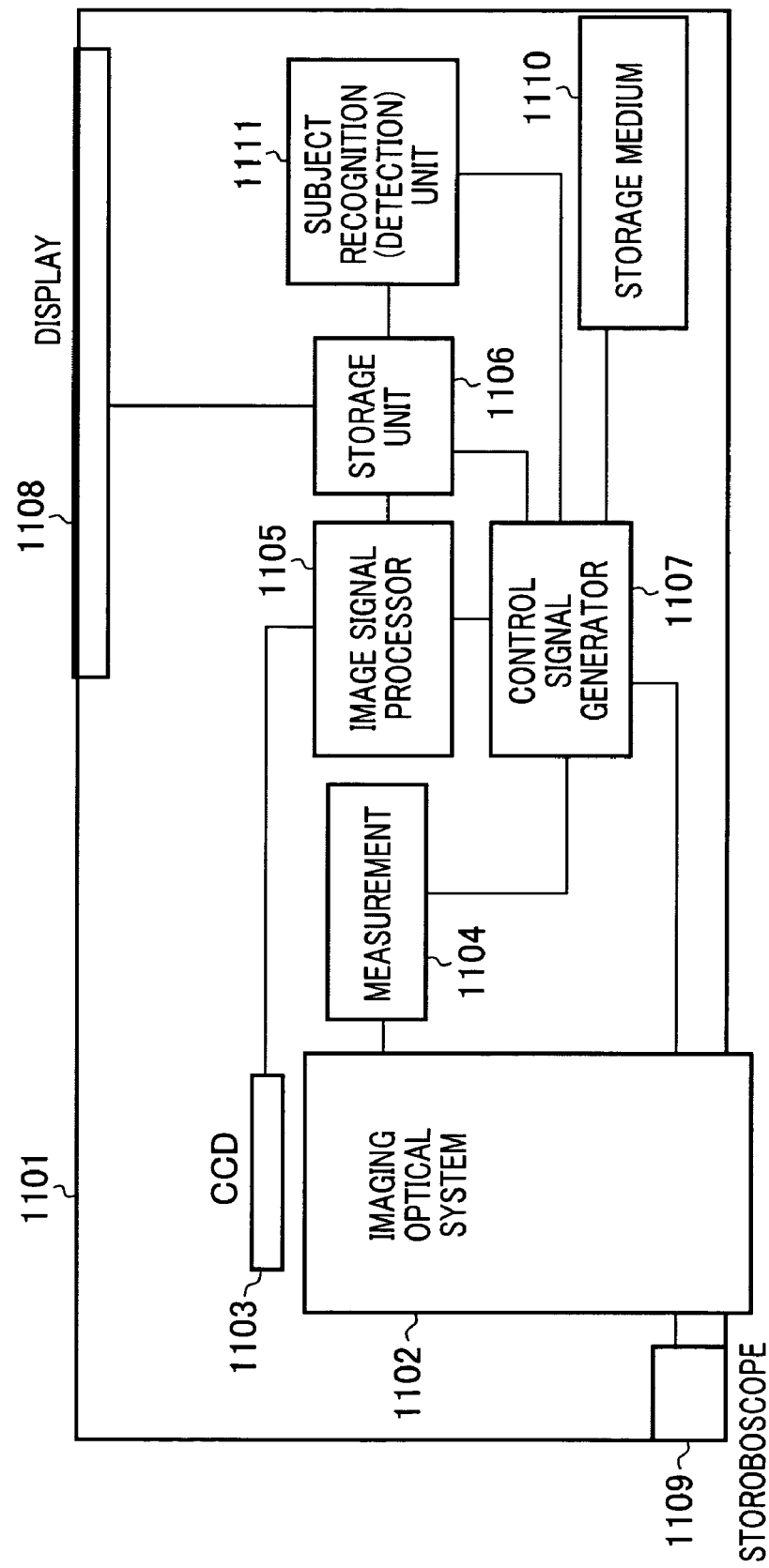

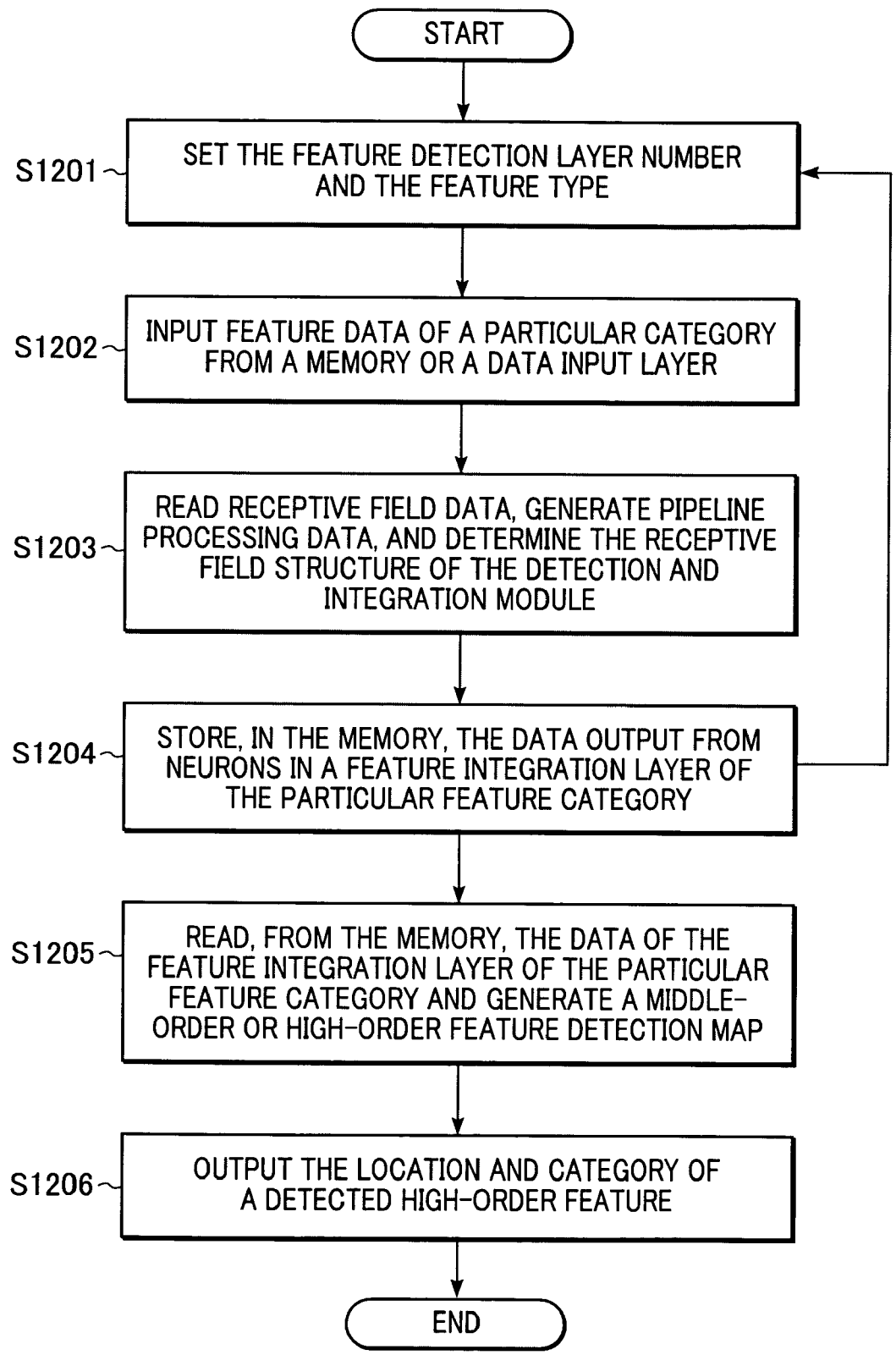

SWITCHING DEVICE (SWD)

- 21 CIRCUIT CONFIGURATION INFORMATION STORAGE UNIT
- 22 CIRCUIT CONFIGURATION CONTROLLER
- 23 RECONFIGURATION CIRCUIT

HIERARCHICAL PROCESSING APPARATUS

BACKGROUND OF THE INVENTION

1. Field of the Invention

The present invention relates to a hierarchical processing apparatus using a parallel operation for use in pattern recognition or the like and also to a method thereof.

2. Description of the Related Art

One known technique of image or speech recognition is to execute a recognition algorithm designed for a particular pattern on a computer. Another known technique is to perform image or speech recognition using a designated parallel image processor (such as a SIMD or MIMD).

A typical example of the image recognition algorithm is to calculate the similarity degree of a feature with respect to a model pattern to be detected. More specifically, model data indicating template models to be detected is prepared, and the similarity between an input image (or a feature vector thereof) and template models is determined by calculating, for example, the high-order correlation coefficient. It is known to use hierarchical parallel processing to determine the similarity.

In order to make it possible for a semiconductor integrated circuit to be used for a wide variety of image/speech recognition, Japanese Patent Laid-Open No. 6-274459 disclose a technique in which a semiconductor integrated circuit is formed of an electrically rewritable nonvolatile memory, a plurality of processors, and a programmable switch array for programmably connecting the plurality of processors, such that the connection among processors can be changed after completion of producing the semiconductor integrated circuit.

However, the former technique is poor in versatility, and the latter technique needs a large-scale circuit that needs high power consumption. Thus, there is a need for a versatile circuit capable of performing a wide variety of complicated calculations with a simple circuit configuration that needs low power consumption.

Japanese Patent Laid-Open Nos. 11-168185 and 2000-331113 disclose techniques of connecting analog processing elements in a reconfigurable fashion using a FPGA. In the technique disclosed in Japanese Patent Laid-Open No. 11-168185, a FPGA is disposed in one layer of a multilayer substrate, analog processing elements are disposed in another layer, and the FPGA and the analog processing elements are connected with each other via input/output terminals and an interface circuit. In the technique disclosed in Japanese Patent Laid-Open No. 2000-331113, first and second analog signals are converted into pulse width modulated (PWM) signals, and the resultant signals are input to a FPGA circuit, which performs a logical operation on the two PWM signals, thereby achieving reconfigurability.

Japanese Patent No. 2679730 discloses an architecture of realizing a hierarchical-structure neural network by using a single-layer hardware apparatus in a time-division multiplexed fashion such that the single-layer hardware apparatus virtually operates as a multilayer processing apparatus. More specifically, the neural network includes a set of single-layer neuron model units connected with each other. A time-division multiplexed analog signal is applied to each single-layer neuron model unit. The time-division multiplexed analog signal is multiplied by digital weight data supplied from the outside thereby time-sequentially obtaining products. The sum of the products is determined by time-sequentially adding (integrating) the products via a capacitor, and the resultant voltage is passed through a nonlinear output function and time-sequentially output. The outputs of the set of single-layer units are fed back to the inputs of the set of single-layer units via a feedback line. The operation of time-sequentially multiplexing the analog signals output from the respective units of the set of single-layer units and the feeding-back operation are performed under the control of a controller so that the set of single-layer units is used in the time-division multiplexed fashion thereby virtually realizing a hierarchical-structure neural network.

U.S. Pat. No. 5,959,871 discloses a FPAA (Field Programmable Analog Array) circuit including a multiplexer, demultiplexer, a controller, and programmable analog processing cells each including analog processing elements, wherein the analog processing cells are disposed in parallel via signal lines so that programmable analog processing can be performed.

In those techniques, the number of input/output terminals increases exponentially with the number of operation elements, and it becomes impossible to arbitrarily set a necessary interconnection structure. That is, no technique is known that perfectly meets the need for a small-scale low-power circuit capable of performing complicated parallel hierarchical processing.

SUMMARY OF THE INVENTION

Accordingly, an object of the present invention is to provide a method of performing complicated parallel hierarchical processing by using a small-scale low-power circuit.

Another object of the present invention is to provide a small-scale low-power circuit capable of performing complicated parallel hierarchical processing.

According to one aspect, the present invention which achieves these objectives relates to a hierarchical processing apparatus comprising data input means for time-sequentially inputting pattern data in a particular hierarchical level, a calculation parameter control data memory for storing calculation parameter control data, detection means for detecting a particular feature from pattern data, using the calculation parameter control data, an intermediate result memory for storing intermediate data output from the detection means, and control means for controlling a flow of data depending on the hierarchical level of the processing such that an input acquired via the data input means or an intermediate result fed back from the intermediate result memory and calculation parameter control data read from the calculation parameter control data memory are supplied to the detection means.

According to another aspect, the present invention which achieves these objectives relates to a hierarchical processing apparatus comprising data input means for inputting local data by scanning pattern data in a particular hierarchical level, first detection means for detecting a local feature from the pattern data, scanning position change means for changing a scanning position of the data input means in accordance with the class of the local feature, second detection means for detecting, from a plurality of local features detected at different scanning positions, the presence/absence of a feature of a higher order than the order of the detected local features, an intermediate result memory for temporarily storing data output from the second detection means, and coupling means for feeding back a signal output from the intermediate result memory to the first detection means.

According to still another aspect, the present invention which achieves these objectives relates to a signal processor comprising a processing circuit, circuit configuration information storage means for storing circuit configuration information, and circuit configuration control means for outputting a control signal to the processing circuit in accordance with the circuit configuration information read from the circuit configuration information storage means, wherein the processing circuit comprises a plurality of analog processing blocks for modulating an input signal, a plurality of intermediate result memory blocks for temporarily storing signals output from the plurality of analog processing blocks, a plurality of calculation parameter control data memory blocks for storing data used to control calculation parameters associated with the plurality of analog processing blocks, and a plurality of signal lines for connections among the plurality of intermediate result memory block and/or the plurality of analog processing blocks, whereby the circuit configuration control means controls reading of data from the calculation parameter control data memory block such that the processing circuit performs signal processing differently depending on the data read from the calculation parameter control data memory block.

According to yet another aspect, the present invention which achieves these objectives relates to a signal processor comprising a processing circuit, circuit configuration information storage means for storing circuit configuration information associated with the processing circuit and also storing data used to control the calculation parameter thereof, and circuit configuration control means for outputting a control signal to the processing circuit in accordance with the circuit configuration information and the calculation parameter control data read from the circuit configuration information storage means, wherein the processing circuit includes a plurality of switch blocks, a plurality of first-type analog processing blocks, a plurality of second-type analog processing blocks, and an intermediate result memory block for storing outputs of the second-type analog processing blocks, those blocks being connected with each other via signal lines with a particular connection pattern, each first-type analog processing block modulates a signal output from a second-type analog processing block, each second-type analog processing block consolidates signals input from a plurality of first-type analog processing blocks and outputs a resultant signal, each switch block includes a plurality of switch elements and a plurality of signal lines, and the circuit configuration control means controls the on/off-state pattern of the plurality of switch elements or controls the signal modulation parameters associated with the analog processing blocks such that the processing circuit performs signal processing differently depending on the on/off-state pattern or the signal modulation parameters.

According to a further aspect, the present invention which achieves these objectives relates to a signal processor comprising a processing circuit, circuit configuration information storage means for storing circuit configuration information and calculation parameter control data, and circuit configuration control means for outputting a control signal to the processing circuit in accordance with the circuit configuration information and the calculation parameter control data read from the circuit configuration information storage means, wherein the processing circuit includes a plurality of switch blocks each including a plurality of switch elements and a plurality of signal lines, a plurality of logical processing blocks, a plurality of analog processing blocks for modulating a signal input thereto, a plurality of intermediate result memory blocks for storing one or more signals output from some of the plurality of logical processing blocks or analog processing blocks, those blocks being connected with each other via signal lines, and the circuit configuration control means controls the on/off-state pattern of the plurality of switch elements or controls the amounts of modulation performed by the analog processing blocks such that the processing circuit performs signal processing differently depending on the on/off-state pattern or the amounts of modulation.

According to a further aspect, the present invention which achieves these objectives relates to a pattern recognition apparatus comprising input means for inputting pattern data, a processing circuit, circuit configuration information storage means for storing circuit configuration information, and circuit configuration control means for outputting a control signal to the processing circuit in accordance with the circuit configuration information read from the circuit configuration information storage means, wherein the processing circuit includes at least a plurality of switches, a plurality of analog processing blocks, a plurality of intermediate result memory blocks for storing data output from some of the analog processing blocks, and signal lines for connections among the switches and/or analog processing blocks, the circuit configuration information storage means stores at least one on/off-state pattern of the plurality of switches and one set of signal modulation data associated with the plurality of analog processing blocks, and the circuit configuration control means includes output means that controls the on/off-state pattern of the plurality of switches and supplies particular calculation parameter control data to the plurality of analog processing blocks in accordance with the circuit configuration information read from the circuit configuration information storage means such that a plurality of particular feature categories are detected at a plurality of particular locations from a part or all of the input pattern and the detected feature categories are output.

Other objectives and advantages besides those discussed above shall be apparent to those skilled in the art from the description of a preferred embodiment of the invention which follows. In the description, reference is made to accompanying drawings, which form a part thereof, and which illustrate an example of the invention. Such example, however, is not exhaustive of the various embodiments of the invention, and therefore reference is made to the claims which follow the description for determining the scope of the invention.

BRIEF DESCRIPTION OF THE DRAWINGS

FIG. 10 is a diagram showing main parts of an image taking apparatus using a pattern recognition apparatus.

FIG. 11 is a flow chart of a process according to the fourth embodiment.

DESCRIPTION OF THE PREFERRED EMBODIMENTS

The present invention is described in further detail below with reference to preferred embodiments in conjunction with the accompanying drawings.

First Embodiment

General Construction and Outlines of Components

Figure 1:
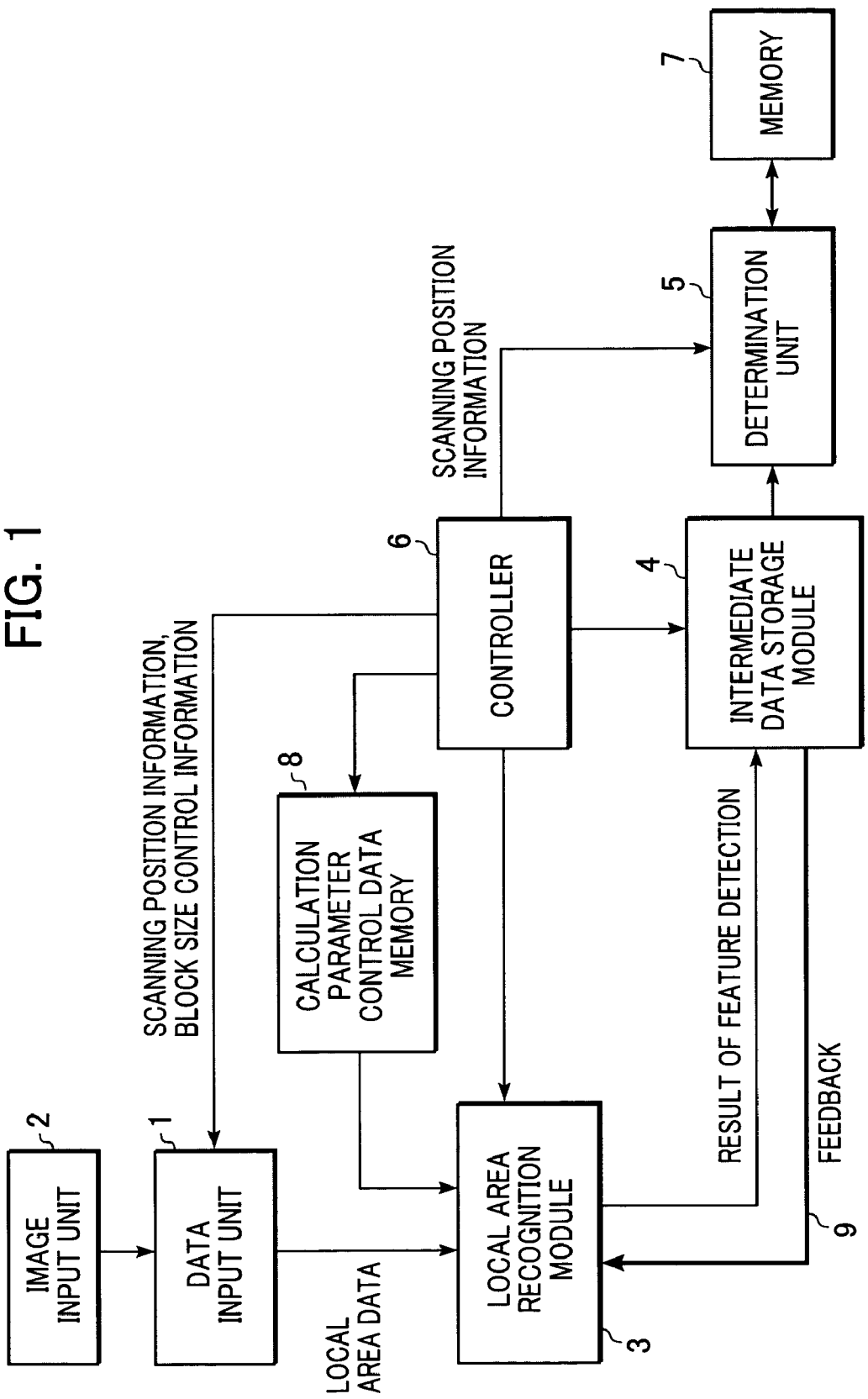
FIG. 1 is a diagram showing main parts of a pattern recognition apparatus according to a first embodiment of the present invention.

A first embodiment of the present invention is described in detail below. FIG. 1 shows a general construction of the pattern recognition apparatus according to the first embodiment of the present invention. The pattern recognition apparatus includes an image input unit 2, a data input unit 1 for inputting local area data from data acquired via the image input unit 2, a local area recognition module 3, an intermediate result storage module 4, a determination unit 5, a controller 6 for controlling the operation of the above parts, and a calculation parameter control data memory 8 for storing data used to control the calculation parameter of the local area recognition module. The intermediate result storage module 4 and the local area recognition module 3 are connected with each other via a feedback coupling line 9 such that data temporarily stored in the intermediate result storage module 4 is fed back to the local area recognition module 3. The functions of those parts are described below.

The image input unit 2 is a sensor such as a CMOS sensor for taking a still or motion image.

The data input unit 1 outputs a read control signal to the image input unit (sensor) 2 to acquire a signal in a local block area of data taken by the image input unit 2. Reading of data from the image input unit 2 may be controlled on the basis of a known technique (such as a technique disclosed in a patent field by the present applicant and laid open as Japanese Patent Laid-Open No. 11-196332). In a case in which a CCD is used as the sensor of the image input unit 2, image data is temporarily stored in a frame memory or the like, and data in a block area is extracted from the data stored in the frame memory while scanning the data. When a local area is changed to a next local area in the scanning process, it is desirable that the new local area and the previous local area partially overlap with each other so that a feature can be successfully detected even when the feature is located near the boundary between the previous local area and the new local area.

The local area recognition module 3 is a module for detecting a feature and is a part of a hierarchical neural network circuit for detecting features of all orders from the lowest to highest orders, wherein the hierarchical neural network circuit will be described later. In this embodiment, two types of data, i.e., data from the data input unit 1 and the data from the intermediate result storage module 4, are input to the local area recognition module 3. The local area recognition module 3 is constructed in the form of an analog/digital hybrid circuit including a circuit for determining the sum of products by means of pulse width modulation.

The local area recognition module 3 outputs, to the intermediate result storage module 4, a signal indicating whether the input local area data includes a feature pattern of one of predefined categories. The structures and operations of the local area recognition module 3 and the intermediate result storage module 4 will be described later.

The controller 6 controls the hierarchical level of the detecting operation performed by the local area recognition module 3 and also controls transmission of data between modules. For example, when the hierarchical level is set to a lowest level, block-area data is input from the data input unit 1 to the local area recognition module 3. In the case in which the hierarchical level is set to a highest level, data is read from the intermediate result storage module 4 and input to the local area recognition module 3.

The controller 6 also reads, from the calculation parameter control data memory 8, data used to control the process (feature detection process) of each hierarchical level and supplies the read data to the local area recognition module 3. The timing of inputting/outputting data from/into the respective modules is controlled by the controller 6 such that all necessary data are supplied when the intermediate data is supplied from the intermediate result storage module 4 to the local area recognition module 3 in the processing in the intermediate hierarchical level.

In the present embodiment, the calculation parameter control data is data indicating synapse coupling weights used in the calculation of the sum of products performed by each neuron of the neural network circuit (i.e., data indicating weighting factors by which the respective input data are weighted and the sum of the weighted values is calculated) or similar control data. The calculation parameter control data is varied depending on the hierarchical level or the feature class to be detected.

The calculation parameter control data memory 8 is a memory for storing the weighting factors described above. A digital memory such as a SRAM, a DRAM, a FeRAM, or a MRAM or an analog memory may be used as the calculation parameter control data memory 8. In the case in which a digital memory is used as the calculation parameter control data memory 8, a digital-to-analog converter (not shown) for converting a digital signal into a pulse modulation signal (such as a pulse width modulation signal or a pulse phase modulation signal) is disposed between the local area recognition module 3 and the calculation parameter control data memory 8.

Figure 4A:
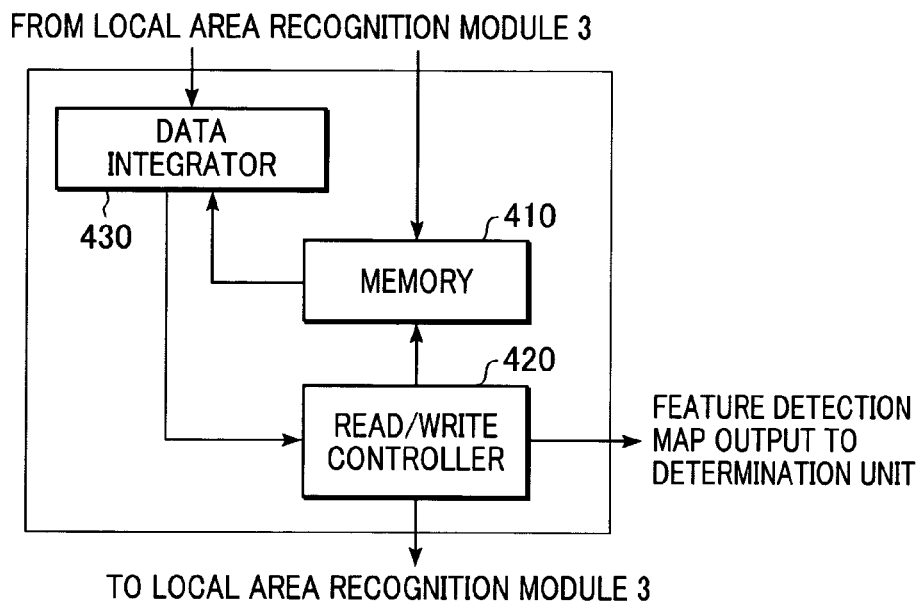
FIG. 4 is a diagram showing an intermediate result storage module.

The intermediate result storage module 4 includes, as shown in FIG. 4A, a memory 410 for temporarily storing data output from the local area recognition module 3, a data read/write controller 420 for controlling reading/writing of data from/into the memory 410, and a data consolidator 430. The data read/write controller 420 is not necessary, depending on the type of the memory used. For example, when a capacitor having a high dielectric constant with no hysteresys is used, no special read/write control signal is necessary.

In the case in which a digital memory is used as the memory 410, the data read/write controller 420 also serves as a circuit (analog-to-digital converter) for converting the analog signal output from the local area recognition module 3 into a digital signal. On the other hand, when an analog memory is used as the memory 410, the digital-to-analog converter and the analog-to-digital converter are not necessary.

The data consolidator 430 combines data output from the local area recognition module 3 in a manner described later. In a case in which it is needed to store only a detection result of a feature in one local area (for example, in a case in which a local feature, which are necessary and sufficient to detect a pattern, can be extracted only from one local data), the data consolidator 430 is not necessary. In the following description, "data consolidation" includes a case in which data are only pooled. In a case in which a highest-order pattern (a pattern to be finally recognized) is obtained as the data (the location and category information) output from the local area recognition module 3, the data consolidator 430 directly transfers the data supplied from the local area recognition module 3 to the determination unit 5.

The memory 410 is needed to store data with particular accuracy (for example, 10-bit data) temporarily (in the longest case, for a period until next detection data is output). A volatile analog memory may be used as the memory 410, if sufficiently high accuracy is obtained. Specific examples of analog memories usable as the memory 410 include a ferroelectric capacitor, a high dielectric constant capacitor, and a FeRAM. A nonvolatile FeRAM is advantageous to store data in a more reliable fashion.

Use of a ferroelectric memory is also advantageous in achieving low power consumption. With regard to the characteristic of the ferroelectric memory used as the memory 410, it is desirable that the accuracy (resolution) be high enough to store value of a voltage or a pulse width with accuracy corresponding to 6 bits over a range corresponding to 10 bits. It is further desirable if the hysteresis of the ferroelectric memory is less than 1 LSB of the range within which the data stored therein can vary (that is, the hysteresis does not cause a difference in stored value depending on the sign and the value). Note that the accuracy (resolution) of the memory is not essential to achieving the advantages of the present invention.

The determination unit 5 examines the data output from the intermediate result storage module 4 in accordance with determination parameters supplied from the controller 6. If determination unit 5 determines that a particular pattern has been detected, the determination unit 5 outputs information indicating the category of the detected pattern and the location of the pattern in the input data.

Figure 2:
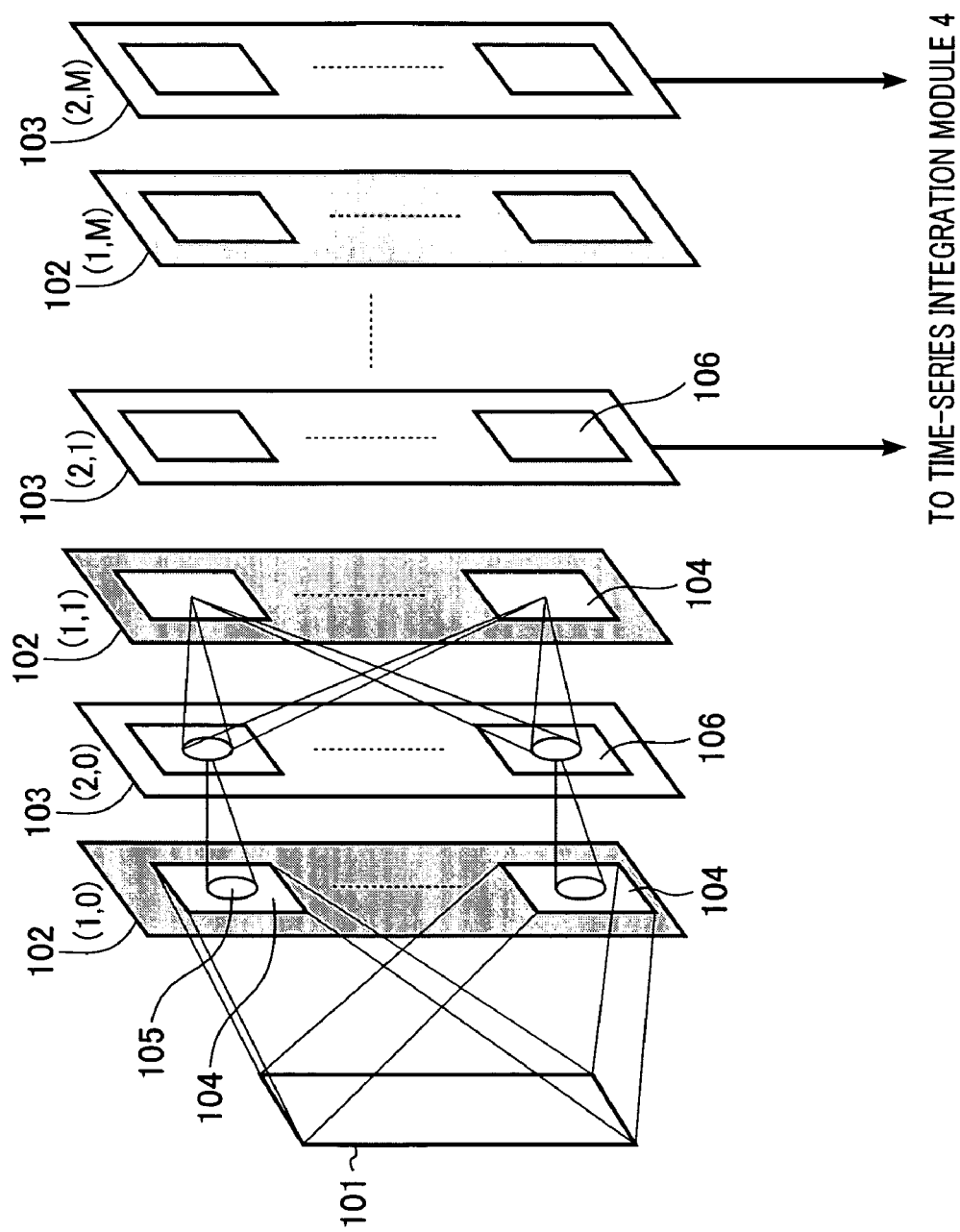
FIG. 2 is a diagram showing main parts of a local area recognition module.

Referring to FIG. 2, the local area recognition module 3 is described in further detail below. The local area recognition module 3 mainly deals with information associated with a pattern or a geometric feature that is in a local area of input data and that is to be recognized (detected). The local area recognition module 3 has, as its basic structure, a part of a convolutional network structure (LeCun, Y., and Bengio, Y., "Convolutional Networks for Images Speech and Time Series" in Handbook of Brain Theory and Neural Networks (M. Arbib, Ed.), MIT Press, 1995, pp. 255–258). (For example, the local area recognition module 3 includes one feature detection layer or one feature consolidation layer described below.) However, the network structure employed in the local area recognition module 3 is different from the conventional one in that layer-to-layer coupling paths can have an overlapping part. A final output indicates a result of recognition, that is, the category of a recognized pattern and the location thereof in the input data.

Data in a local area is detected by a photoelectric conversion device (image data input device) such as a CMOS sensor or a CCD sensor, and the detected local-area data is input into a data input layer 101 via the data input unit 1. Alternatively, analysis (such as principal component analysis or vector quantization) may be performed by a data analyzer on 2-dimensional pattern data, and high-order data obtained from a result of the analysis may be input into the data input layer 101.

By means of multiresolution processing based on a Gabor wavelet transform or a similar technique, a first feature detection layer (1, 0) detects as many low-order local features (which may include not only a geometric feature but also a color feature) as the number of feature categories from an image pattern input via the data input layer 101, in local areas centered at respective specified points (sampling points) over the entire frame of image, for a plurality of scale levels (or for a plurality of resolutions) at each point.

Gabor wavelet is a sinusoidal wave with a particular spatial frequency and orientation, modulated by a Gaussian envelope. In a set of wavelet filters, the respective wavelet filters have a similar function shape, but the principal direction and the size thereof are different from each other. It is known that the wavelet has a localized function shape in a spatial frequency domain and in a real spatial domain, smallest simultaneous uncertainty in terms of location and spatial frequency is obtained, and the wavelet is a most localized function in the real space and the frequency domain (J. G. Daugman, "Uncertainty relation for resolution in space, spatial frequency, and orientation optimized by two-dimensional visual cortical filters", Journal of Optical Society of America A, 1985, vol. 2, pp. 1160–1169).

A detailed description of a method of performing the Gabor wavelet transform using a neural network may be found, for example, in a paper by Daugman (IEEE Trans. on Acoustics, Speech, and Signal Processing, 1988, vol. 36, pp. 1169–1179). Although a method of dealing with boundaries of a local area (a method of retaining Gabor wavelet transform coefficients) is not disclosed in the paper cited above, the deviation from ideal Gabor wavelet transform coefficient values near boundaries can be minimized by multiplying the Gabor wavelet transform coefficients by weighting factors that vary as a function of the distance from the center of a local area (for example, the weighting factor varies as a Gaussian function).

The feature detection layers 102 (1, k) (k≧0) at following stages are classified in accordance with resolution (or scale level), and feature detection cells (neuron elements) belonging to the same class form the same channel even if the hierarchical levels are different (a further detailed description can be found in U.S. Patent Application No. 20020038294 filed by the present applicant).

In the case in which the feature detection layer 102 (1, 0) performs the Gabor wavelet transform, a set of feature detection cells having receptive field structures given by Gabor filter kernels having the same scale level but having different direction selectivity form the same processing channel in the feature detection layer 102 (1, 0). In the following layer 102 (1, 1), feature detection cells (for detecting a higher-order feature), to which outputs of the feature detection cells in the layer 101 (1, 0) are input, belong to the same processing channel.

In further following layers 102 (1, k) (k≧1), feature detection cells to which outputs of feature detection cells in a layer 103 (2, k−1) at a previous stage in the channel belong to the same channel. That is, in each processing channel, processing is progressively performed in the same scale level (or in the same resolution) to detect or recognize features of various orders from the lowest order to the highest order by means of hierarchical parallel processing.

The following feature detection layers 102 ((1, 1), (1, 2), . . . , (1, M)) and the feature consolidation layers 103 ((2, 1), (2, 2), . . . , (2, M)) respectively have their own receptive field structures. As with each layer described earlier, the feature detection layers 102 ((1, 1), (1, 2), . . . , (1, M)) in respective feature detection modules detect different features, and the feature consolidation layers 103 ((2, 1), (2, 2), . . . , (2, M)) consolidate features detected by feature detection layers at previous stages. Note that coupling (interconnections) is made so that outputs from cells in a feature consolidation layer at a previous stage are input to a feature detection layer in the same channel.

The consolidation of features is performed in a hierarchical manner in which input data (input image data) or intermediate data (results detected in intermediate hierarchical levels) are stored in the intermediate result storage module. Each feature detection layer is formed of neuron elements each of which has a receptive field structure determined depending on a feature class to be detected (for example, the direction of a line to be detected as a geometric feature) and which generates a pulse signal corresponding to the feature detection level. The structure and the operation of feature detection layers have been described above.

Each feature consolidation layer 103 (2, j) is formed of neuron elements each of which has a particular receptive field structure (the term "receptive field" is used to describe a coupling range of output devices in a preceding layer, and the term "receptive field structure" is used to describe coupling weights assigned to the respective output devices) and generates a pulse signal. Each neuron element combines outputs of neuron elements in the same receptive field in a feature detection layer 102 (1, j) (and more specifically, each neuron element determines the average of outputs of neuron elements in a local area or performs sub-sampling to determine a maximum output in the local area). The receptive fields of the respective neurons in the same feature consolidation layer have the same structure, and the neurons in the same feature consolidation layer perform processing in a similar manner as far as features in the same class are concerned.

Figure 3A:
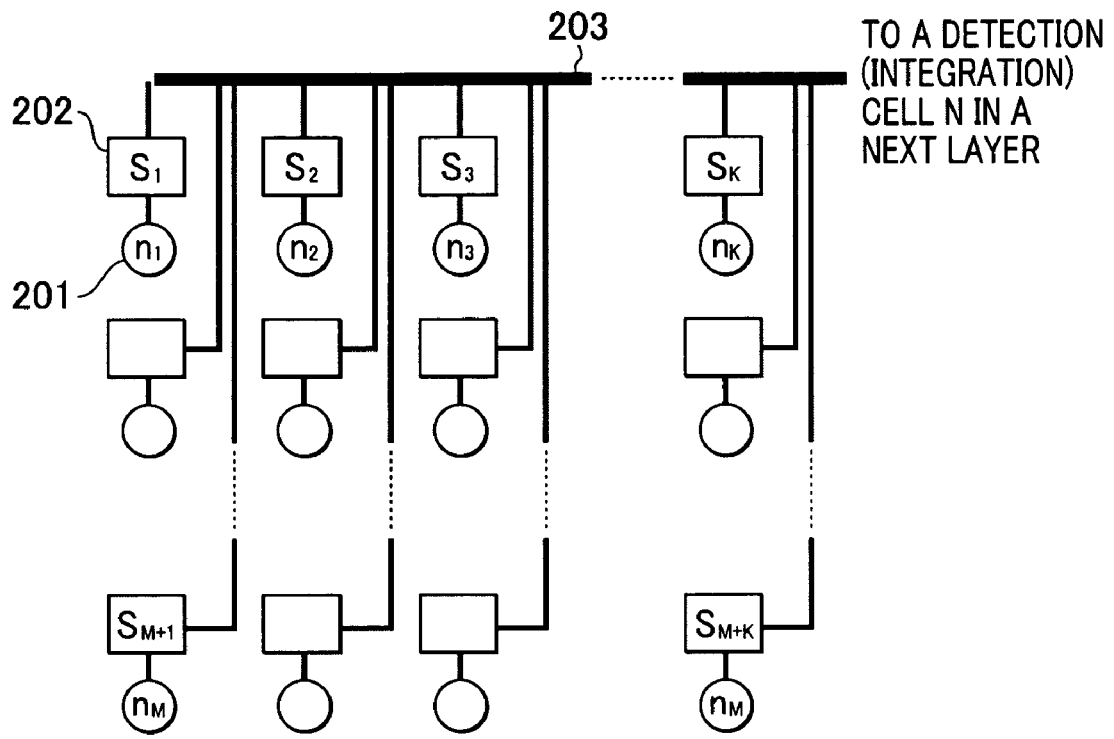
FIG. 3 is a diagram showing synapse elements and neuron elements.
Figure 3B:
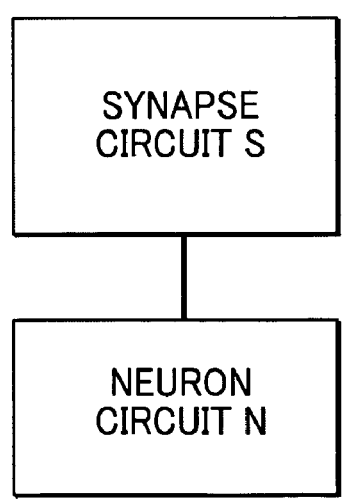

Synapse circuits and neuron elements are shown in FIGS. 3A and 3B. As shown in FIG. 3A, neurons 201 in respective layers are connected with each other via synapse circuits S202 and signal transmission lines 203 (interconnections or delay lines) corresponding to axons or dendrites of nerve cells. FIG. 3A shows connections in terms of outputs of neurons ($n_i$) of feature consolidation cells (feature detection cells) that form a receptive field of a certain feature detection cell (a certain feature consolidation cell) (wherein, when viewed from that certain cell, the outputs of those neurons ($n_i$) can be regarded as inputs to that certain cell). Of the signal transmission lines, a part represented by a thick line in FIG. 3A is a common bus line for time-sequentially transmitting pulse signals output from a plurality of neurons. When signals outputs from cells are received, signals are transmitted in a similar manner. That is, input signals may be dealt with using the same transmission lines at times different from times at which output signals are dealt with, or two similar transmission line systems may be provided such that one (dendrite) is used for dealing with input signals and the other (axon) is used for dealing with output signals.

In each synapse circuit S (202), excitation coupling causes a pulse signal to be amplified, and suppression coupling causes a pulse signal to be attenuated. In the case in which information is transmitted by a pulse signal, amplification and attenuation can be achieved by any one of amplitude modulation, pulse width modulation, phase modulation, and frequency modulation. In this embodiment, each synapse circuit S (202) operates as a phase modulation element by which amplification of a signal is converted into an advance in pulse arrival time corresponding to a feature, while attenuation is converted into a delay. That is, each synapse coupling advances or delays, by an amount depending on a feature, the arrival time (phase) at which a signal arrives at a neuron connected to an output of the synapse. Qualitatively, excitation coupling causes an arrival pulse to be advanced in phase with respect to reference phase, while suppression coupling causes the arrival pulse to be delayed.

In FIG. 3A, each neuron element $n_j$ is of the integrate-and-fire type described later and outputs a pulse signal (spike train). As shown in FIG. 3B, synapse circuits may be integrated into a synapse block and neuron elements may be integrated into a neuron block.

Neurons forming respective layers are described in further detail below. Each neuron element is based on an extension model of the integrate-and-fire neuron model. The operation of each neuron element is similar manner to an integrate-and-fire neuron in that the neuron fires and outputs a pulse signal when a value obtained as a result of linearly adding input signals (pulse train corresponding to action potential) that are temporally and spatially distributed is greater than a predetermined threshold.

A pulse generator (CMOS circuit) serving as a neuron element may be configured according to a known technique (for example, a circuit disclosed in IEEE Trans. on Neural Networks Vol. 10, p. 540), or an extended or modified circuit may be used.

A technique of controlling the operation (in particular, in terms of the timing of firing) of each neuron element is not essential to the present invention, and thus a further detailed description thereof is not given herein. Transmission of pulse signals among neurons may be performed, for example, on the basis of a technique known as an AER (Address Event Representation) method (Silicon Auditory Processors as Computer Peripherals, In Tourestzky, D. (ed), Advances in Neural Information Processing Systems 5, Lazzaro, et al, 1993, San Mateo, Calif., Morgan Kaufmann Publishers) or on the basis of other technique.

Processing performed by the local area recognition module 3 and the intermediate result storage module 4 are described in detail below.

The data output to the intermediate result storage module 4 from the local area recognition module 3 includes information indicating the presence/absence and the location of a high-order pattern (for example, a pattern of a face to be finally recognized) or a middle-order pattern (such as an eye or a mouth in the face) included in the high-order pattern in a local area of a feature class in a hierarchical level. Determination as to presence/absence of a local feature of a particular class is performed on the basis of presence/absence of a pulse signal output from a neuron associated with that feature class in the feature consolidation layer, and the location of the local feature is determined on the basis of the location, in the particular class, of the neuron that has generates the pulse signal.

When the local area recognition module 3 performs processing in the highest layer, if, of the outputs of the feature consolidation layer in the highest layer, the maximum value of outputs of neurons of a feature consolidation module associated with a particular feature category $f_{NM}$ is greater than a predetermined threshold value, the maximum output from that neuron indicates the detected category and the detected location (the location is determined by which neuron in the feature consolidation module has the maximum output), and the output is supplied to the intermediate result storage module 4.

Figure 7:
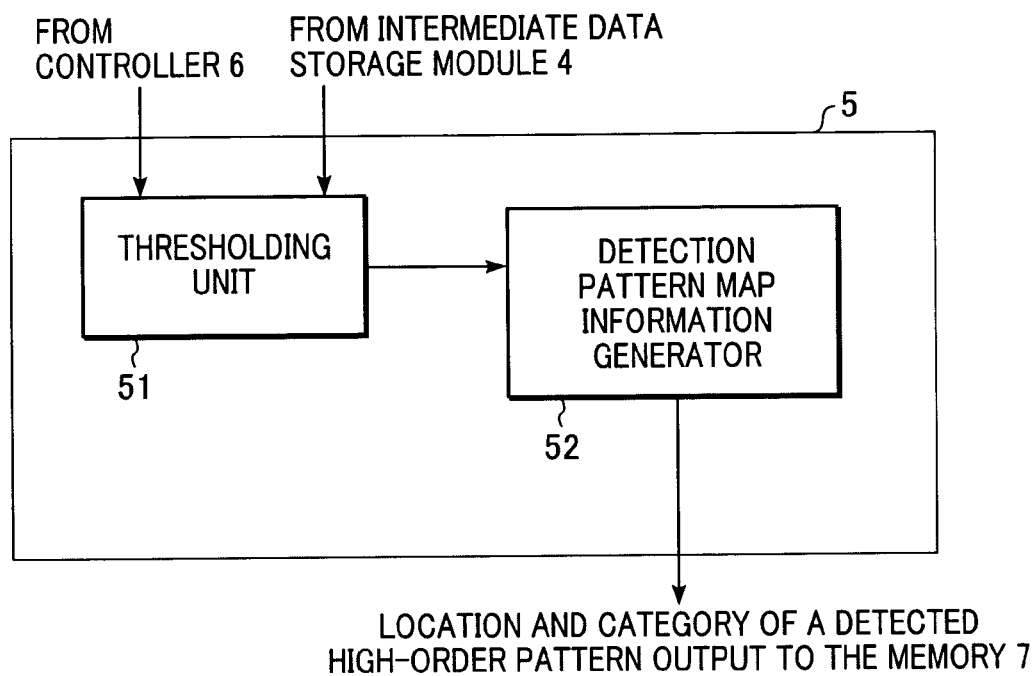
FIG. 7 is a diagram showing a construction of a determination unit.

The construction of the determination unit 5 is described below with reference to FIG. 7. The determination unit 5 includes a thresholding unit 51 and a detection pattern map generator 52. The thresholding unit 51 performs thresholding on the pattern detection level signal supplied from the intermediate result storage module 4. In a case in which the threshold value depends on the input data (associated with a pattern to be detected), threshold information is given by the controller 6.

In the middle of processing before a high-order pattern is finally detected, a detection level signal of a particular pattern (a local feature) that is predicted to be detected in a certain hierarchical level is input from the intermediate result storage module 4 to the thresholding unit 51. If the detection level signal is higher than the threshold value, the detection pattern map generator 52 stores information indicating the category of the detected pattern and the location thereof (index assigned to the neuron in the feature consolidation module) into a memory for storing pattern map information indicating a map of all patterns detected from the input data, or detection pattern map generator 52 outputs the above information to a display or the like.

Use of the processing procedure described above makes it possible to detect the location of a pattern of a particular category from input data (input image data) in a highly efficient manner using a simple circuit configuration. That is, a great reduction in circuit complexity and a great increase in efficiency of recognition process can be achieved. In particular, storing intermediate data in a memory and performing processing in following layers by using the same circuit but while varying calculation parameters (for example, parameters indicating the synapse coupling weights or indicating input-output nonlinear characteristic of neurons) make it possible to perform complicated calculations using the simple circuit.

The pattern recognition apparatus descried above may be advantageously installed in a camera or a vision module of a robot or in an image input unit of other apparatus. The pattern recognition apparatus may also be advantageously installed in an image output device such as a printer or a display. Use of the pattern recognition apparatus in such a module or a device makes it possible to recognize or detect a particular subject and perform a particular operation in accordance with the detected subject, using a simple circuit with low power consumption. For example, the pattern recognition apparatus may be installed in an image input unit to detect a subject and perform or control focusing, exposure, zooming, and/or color correction or the detected subject. By installing the pattern recognition apparatus in an image output device, it becomes possible to automatically perform optimum color correction for a particular subject.

Focusing, color correction, and exposure control for a particular subject detected by the pattern detection (recognition) apparatus installed on an imaging device in accordance with the present embodiment are described below with reference to FIG. 10. FIG. 10 shows an example of a construction of an imaging device using the pattern detection (recognition) apparatus according to the present embodiment of the invention.

The imaging device 1101 shown in FIG. 10 includes an imaging optical system 1102 including an imaging lens and a zoom control mechanism, a CCD or CMOS image sensor 1103, an imaging parameter measurement unit 1104, an image signal processor 1105, a storage unit 1106, a control signal generator 1107 for generating a control signal to control the imaging operation or imaging conditions, a display 1108 also serving as an electronic viewfinder, a stroboscopic lamp 1109, and a storage medium 1110. The imaging device 1101 further includes the pattern recognition apparatus serving as a subject detection (recognition) apparatus 1111 that performs pattern recognition by means of time division multiprocessing.

In this imaging device 1101, a pre-registered face image of a person is detected from an image being taken by the subject detection (recognition) apparatus 1111 (and more specifically, the location and the size of the face image are detected). The information indicating the location and the size of the person is supplied from the subject detection (recognition) apparatus 1111 to the control signal generator 1107. In response, the control signal generator 1107 generates a control signal for controlling the imaging operation associated with that person in terms of focusing, exposure condition, and/or white balance, in accordance with the output from the imaging parameter measurement unit 1104.

Use of the pattern detection (recognition) apparatus in the imaging device makes it possible to detect an image of a person quickly (in real time) and control the imaging operation associated with that person on the basis of the detected image, using a small-sized circuit that needs low power consumption.

Second Embodiment

In a second embodiment, when a local area is scanned during a pattern recognition operation, matching between a high-order pattern to be finally detected and middle-order patterns detected in the middle of processing is evaluated in terms of locations of patterns and the class of patterns. Depending on the class of a middle-order pattern detected first, the class and the location of a middle-order pattern that will be detected next are predicted, and the scanning position is jumped in accordance with the predicted class and location. This makes it possible to detect a pattern in an efficient manner compared with the case in which a pattern is detected by means of simple sequential scanning as is the case with pattern detection using raster scanning.

Figure 4B:
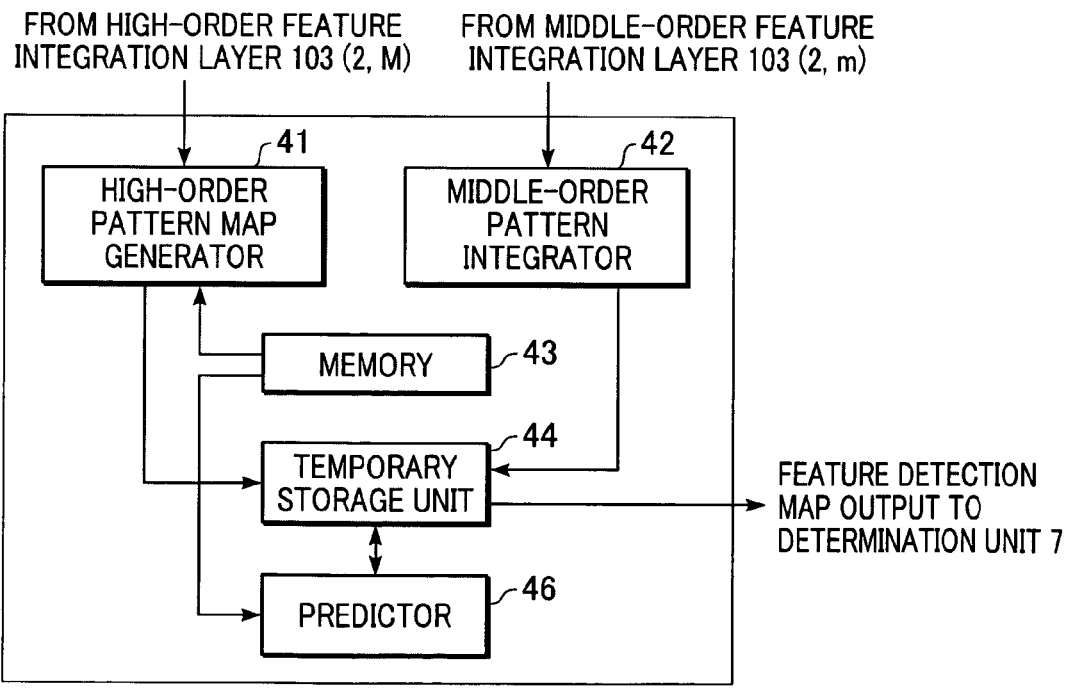

As shown in FIG. 4B, the intermediate result storage module 4 includes a high-order pattern map generator 41 for generating a detection level map and a location map of a high-order pattern (and also outputs information indicating the class of a feature, if necessary), a middle-order pattern consolidator 42 for outputting data indicating a predicted location (described later in detail) of a middle-order pattern to be detected and outputting a category of a high-order pattern that best matches the middle-order pattern, a memory 43 for storing data indicating categories of high-order patterns (for example, data of template patterns), and a temporary storage unit 44 for storing the predicted location of the middle-order pattern.

In a case in which no high-order pattern is detected (that is, in a case in which the detection output level of the high-order pattern is lower than the predetermined threshold value) and only a middle-order pattern is detected, the predictor 46 of the intermediate result storage module 4 selects one of candidates for a high-order pattern that contains the detected middle-order pattern, and the predictor 46 predicts the category and the location of a middle-order pattern that is contained in the selected one of the candidates and that will be detected next, by using a method that will be described later.

The data consolidator 430 outputs, to the determination unit 5, data indicating a detection probability (or a detection confidence level) with which a pattern of the predicted category will be detected at the predicted location with an output level depending on whether the pattern will be detected or not. In response, the controller 6 acquires, from the intermediate result storage module 4, information indicating the predicted location at which the middle-order pattern will be detected, and the controller 6 outputs sampling position control data to the scanning unit 1 to control the scanning position such that a local area, the center of which the middle-order pattern is predicted to be located, is scanned. The details of this process will be described later with reference to FIG. 5.

In a case in which a middle-order pattern is detected in a local area being scanned but a high-order pattern, in which the detected middle-order pattern must be contained, is not detected from the data in that local area (that is, the high-order pattern has a size greater than the size of the local area), the middle-order pattern data will be consolidated with other middle-order pattern data via a time-sequential consolidation process performed by the middle-order pattern consolidator 42, as will be described later, to detect a high-order pattern with a greater size.

As a matter of course, in order that high-order patterns can be detected, high-order patterns must have a size smaller than the block size. In order to make it possible to detect patterns with different sizes by entirely scanning the same input data without changing the block size, the middle-order pattern consolidator 42 has a plurality of processing channels corresponding to pattern sizes, as in the first embodiment.

Now, the middle-order pattern consolidator 42 in the intermediate result storage module 4 is described. The middle-order pattern consolidator 42 is a signal processor (in the form of middleware) that outputs a predicted category of an undetected middle-order pattern included in a possible high-order pattern in which already-detected middle-order patterns are included ant also outputs a predicted location thereof near the already-detected middle-order patterns.

In the present embodiment, on the basis of the predefined pattern class (the class of a high-order pattern, such as a full face pattern) to be detected and the class of a detected middle-order pattern (such as an eye pattern included in the face pattern), the class (the category) of an undetected middle-order pattern (for example, a pattern of the other eye, a nose, or a mouth) and the predicted location thereof are determined.

In the present embodiment, in order to achieve simplification of the circuit configuration, the circuit (the predictor 46) for performing the above-described prediction is a logic circuit that performs prediction on the basis of list-structured combinational data described in a list form or a dictionary form and also on the basis of associated data (relative position vectors of candidates for middle-order patterns) without performing stochastic process calculations or other complicated calculations that would need high calculation power.

Figures 6A, 6B:
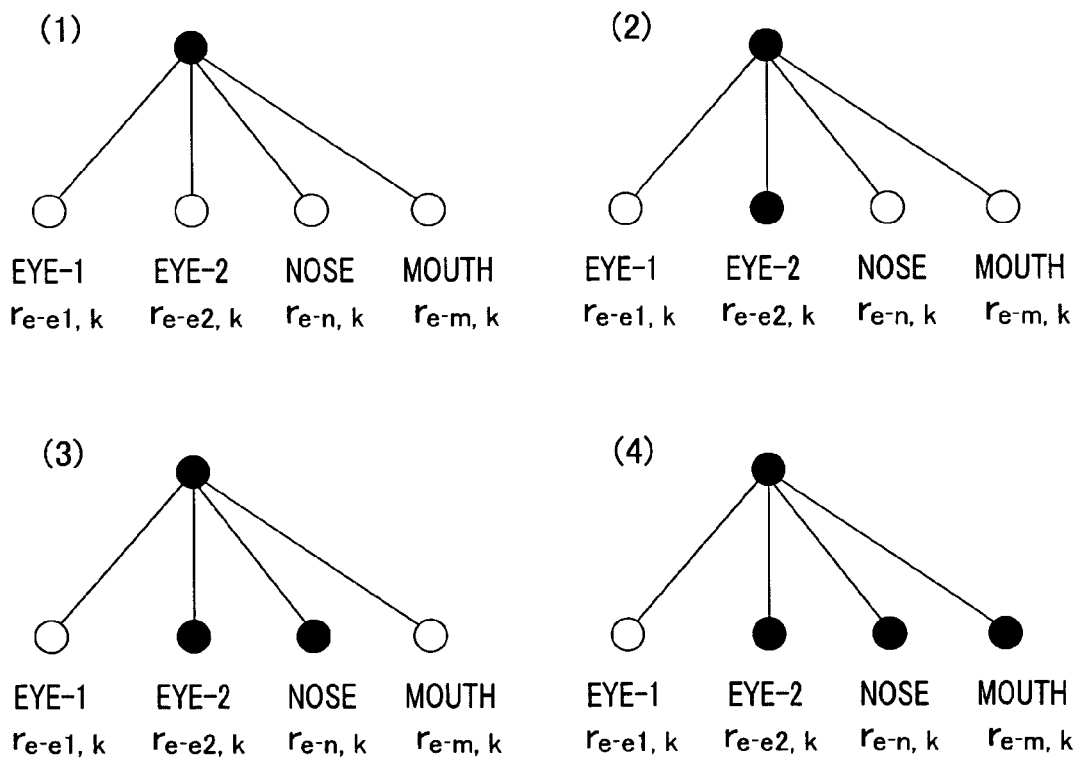
FIG. 6A shows list-structured data indicating locational relationships among middle-order features.
FIG. 6B shows a process of detecting middle-order features.

As shown in FIG. 6A, the list-structured data includes data associated with middle-order patterns included in a high-order pattern, wherein the data associated with the middle-order patterns are linked with each other. The associated data represent the distances and directions of the respective middle-order patterns, using relative position vectors.

The predicted location varies depending on the class of a detected middle-order pattern and a processing channel including a neuron outputting a maximum value of the values output from neurons of a feature consolidation layer 103 (2, m) of the local area recognition module 3. That is, in the present embodiment, the class of a pattern to be detected or the size of a feature to be detected is reflected in a processing channel used, and the predicted location of an undetected middle-order pattern depends on the size thereof.

Figure 5:
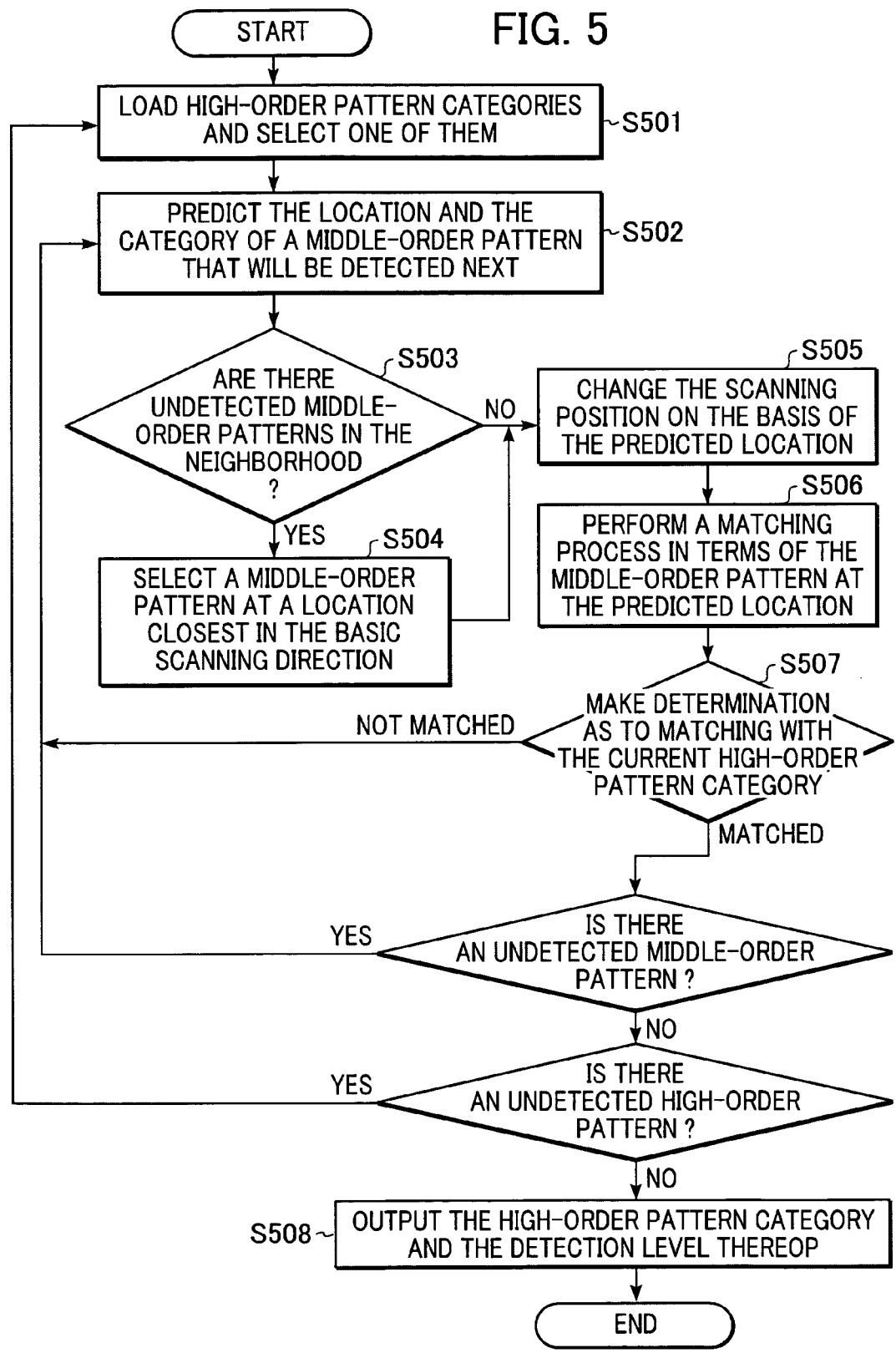
FIG. 5 is a flow chart showing a data consolidation process performed by the intermediate result storage module.

With reference to FIG. 5, the process performed mainly by the intermediate result storage module 4 is described below. In a case in which a plurality of high-order patterns are prepared for use in detection and there is a category of a middle-order pattern that is included in common in different high-order patterns, the intermediate result storage module 4 performs processing in a manner described below with reference to FIG. 5.

First, in step S501, category information associated with a high-order pattern including the category of a middle-order pattern detected by the local area recognition module 3 is read from the memory 43 in the intermediate result storage module (time-sequential consolidation module) 4.

In step S502, the category and the predicted location of a middle-order pattern that will be next detected with a high probability at the predicted location near the detected middle-order pattern are determined for each high-order pattern and stored in the temporary storage unit 44.

In step S503, it is determined whether there are a plurality of undetected middle-order patterns whose predicted location is close to the location of the detected middle-order pattern. If it is determined that there are a plurality of such patterns, a middle-order pattern whose predicted location is closest in the basic scanning direction (for example, to the right, or in a direction from upper left to lower right) is selected (step S504).

In step S505, the data indicating the predicted location of the middle-order pattern selected by the middle-order pattern consolidator 42 is input to the controller 6, for use in controlling the scanning position. The controller 6 converts the predicted location information to scanning position data according to which a local area is to be scanned in the data input unit 1.

In step S506, the local area recognition module 3 supplies the signal, output from the feature consolidation layer 103 (2, m) associated with middle-order patterns and indicating the result of evaluation of matching with candidates (one by one in a predetermined order) for a high-order pattern that matches the detected middle-order pattern in terms of a predicted category at a predicted location, to the middle-order pattern consolidator 420.

After the scanning position is changed, the middle-order pattern consolidation unit 420 of the intermediate result storage module 4 inputs, under the control of the scanning unit 1, recognition result data associated with a local area from the local recognition module 3 (as in step S504) and evaluates matching with the category of the middle-pattern that has already been detected in a manner described later (step S507). If good matching is detected, information indicating the category of the high-order pattern determined to have good matching and the detection level (indicating the presence probability or detection confidence level) are output to the determination unit 5 (step S508). The prediction and the evaluation in the middle-order level are performed repeatedly until no more undetected middle-pattern is detected.

The determination as to matching among middle-order patterns on the basis of the category of a high-order pattern (step S507) is described below. When the category of a high-order pattern and the category of an already-detected middle-order pattern are given, matching can be evaluated by means of simple comparison with data indicating categories and relative locations of middle-order patterns represented in the form of a table and stored in a memory, using a simple logic circuit.

FIG. 6A shows an example of data indicating relative locations of middle-order patterns expressed in the form of a table. Herein, it is assumed that the category of a high-order pattern is a face and a middle-order pattern of "eye" has been detected first. It is also assumed that the size of the middle-order pattern is given by the processing channel number (scale level) k of the feature consolidation layer 103 (2, m) associated with that middle-order pattern. The categories and the locations of remaining middle-order patterns that match the high-order pattern of "face" and the middle-order pattern of "eye" are given by nose" and $r_{e-n,k}$, "mouth" and $r_{e-m,k}$, and "eye" and $r_{e-e1,k}$, $r_{e-e2,k}$, where r denotes a relative position vector with respect to the already-detected middle-order pattern.

Note that the remaining "eye" has two position vectors, because either one of two eyes can be first detected as a middle-order pattern. It is possible to determine which one of the two eyes has already been detected, by determining whether a pattern of the other eye can be detected in a predicted direction (and thus, at this stage, it is possible to determine which is a right or left eye pattern. In a case in which a plurality of middle-order patterns (for example "eye" patterns and a "nose" pattern) have already been detected, it is apparent that the relative position vector of any remaining pattern (for example a "mouth" pattern) can be uniquely determined.

FIG. 6B shows a process of detecting middle-order patterns for a particular high-order pattern. In this specific example, it is assumed that the category of a high-order pattern to be detected is a face, and it is also assumed that an eye pattern is a middle-order pattern detected first. In FIG. 6B, all middle-order patterns (including eyes, nose, and mouth) are represented in the form of a tree structure. In the tree structure, the status of each node is represented by an open circle (when a corresponding pattern is undetected) or a solid circle (when a corresponding pattern has already been detected). Eye-1 denotes a left eye and eye-2 denotes a right eye. If the basic scanning direction is defined such that categories undetected middle-order patterns are sequentially examined from left to right in the tree structure shown in (1) of FIG. 6B, the detection state changes from that shown in (1) of FIG. 6B to (4) of FIG. 6B. In the specific example shown in FIG. 6B, eye-2, which is one of two eyes, is detected at a predicted location.

Third Embodiment

Figure 8:
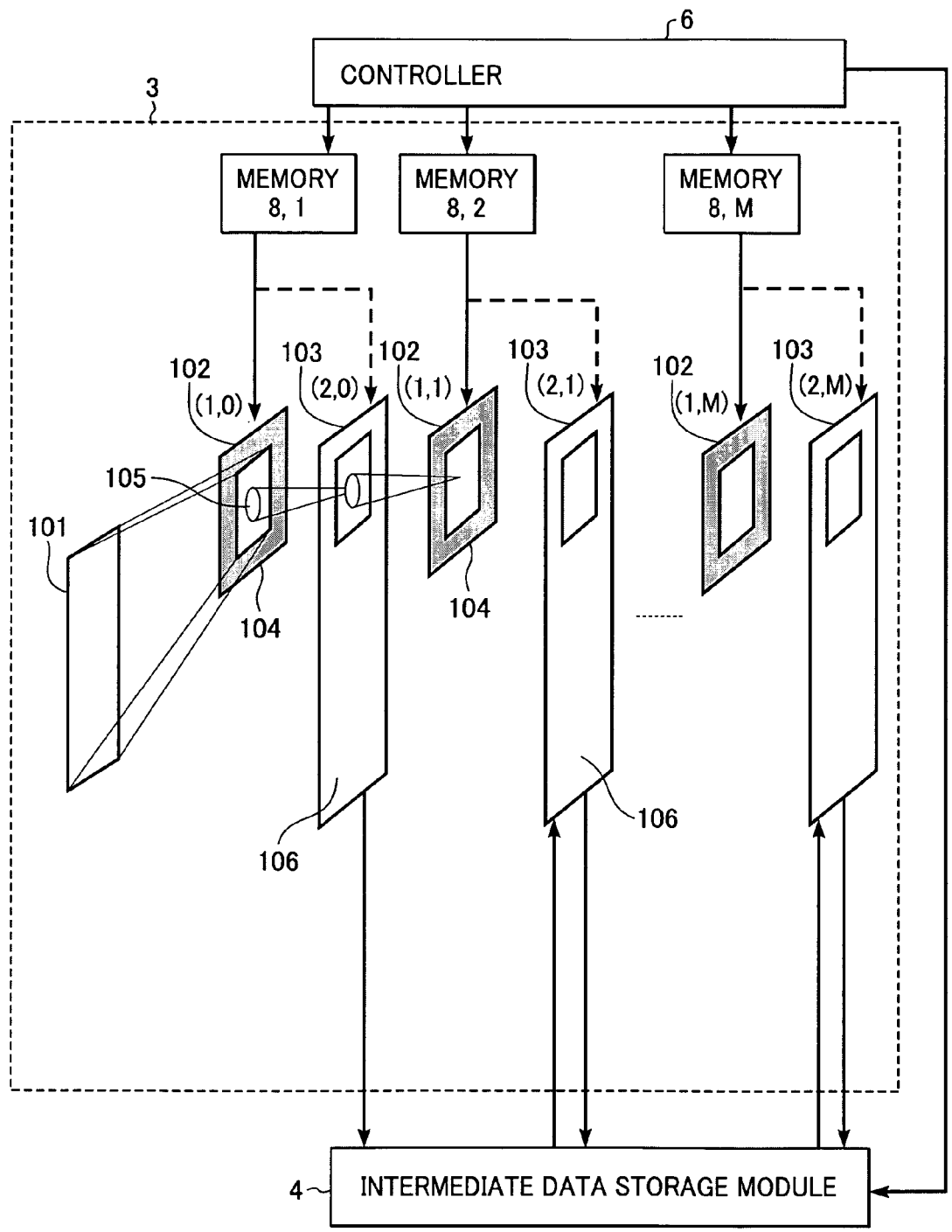
FIG. 8 is a diagram showing main parts of a third embodiment of the present invention.

FIG. 8 shows main parts of a third embodiment of the present invention. In this third embodiment, it is assumed that there is only one class (category or size) to be detected in each feature detection layer at an arbitrary time, and the class is time-sequentially changed by the controller 6. Thus, the number, s, of feature classes disposed in parallel in each layer in the local area recognition module 3 is much smaller than the number, N, of feature classes in the first embodiment (s can be equal to 1).

For the same local area of input data acquired via the data input unit 1, the local area recognition module 3 stores intermediate result data of a pattern of a particular category at each sampling point of the input data into the memory 410 (not shown in FIG. 8) in the intermediate result storage module 4, wherein the category is varied time-sequentially. In processing in the next hierarchical level, data is read from the memory 410 and input to the local area recognition module 3 via the feedback path 9. While performing processing from one hierarchical level to next, data indicating an intermediate result of detection in each feature consolidation layer is read from the memory 410 as required and consolidated by the data consolidator 430 in the intermediate result storage module 4 in a similar manner as in the first embodiment.

Of feature detection layers 102 and feature consolidation layers 103 disposed in a cascade fashion used in the previous embodiments, one feature detection layer 102 and one feature consolidation layer 103 are realized at a time in the local area recognition module 3, and patterns are detected hierarchically from a lowest-order pattern to a highest-order pattern.

Outputs of a feature detection layer 102 currently realized in the local area recognition module 3 are subjected to sub-sampling performed by a feature consolidation layer 103 at a following stage as in the previous embodiments, and data indicating the result is temporarily stored in the memory 410 in the intermediate result storage module 4 wherein data are stored in different memory areas depending on the feature class. The synapse weighting factors (the local receptive field structure) in the feature detection layer 102 are time-sequentially changed and detection result data of a particular feature class, which is also time-sequentially changed, are input to the feature detection layer 102 from the memory 8. For example, when the feature detection layer 102 is should be set so as to have a local receptive field structure for detection of an eye pattern (middle-class pattern), the controller 6 reads the data for controlling the local receptive field structure from the memory 8 and supplies it to the feature detection layer 102 when data of low-order patterns P1, P2, . . . , Pn necessary to detect the middle-order pattern (the eye pattern, in this specific example) are read from the memory 410 and input.

The data indicating the local receptive field structure of the feature detection layer 102 corresponding to each feature class is stored in the memory 8, which may be realized by a SRAM or a FeRAM. The data is read from the memory, and the local receptive field structure is changed in accordance with the data.

That is, the receptive field structure of neurons of the feature detection layer 102 is changed in accordance with the control signals from the controller 6 and the receptive field controller 45 so as to detect various patterns in a predetermined order. For example, the receptive field structure of neurons of the feature detection layer 102 is set so as to detect an eye pattern (middle-order feature) at a certain time, but at another time, the receptive field structure is set so as to detect a nose pattern or a mouth pattern.

As described above, when input data in a local area is given, time-division multiprocessing is performed using the same local area recognition module 3 to detect (recognize) different features. This allows a great reduction in circuit complexity compared with a circuit needed to detect different features separately and parallel at the same time at sampling positions of the input data.

The receptive field structure is time-sequentially changed in accordance with configuration bits (CBs) of a FPGA or a FPAA that can be dynamically reconfigured or in accordance with data indicating synapse weighting factors assigned to respective receptive field structures read from the memory 8 wherein the operation including reading data from the memory 8 is controlled by the controller 6.

To realize a neural network including neurons having a local receptive field structure, a memory for storing data that determines coupling weights of respective neurons and a controller are generally needed. To realize the local area recognition module 3 having the configuration used in the first embodiment, one set of coupling weight data for each feature category, the memory 8, and the controller 6 are sufficient for the above purpose.

That is, in a case in which the feature detection layer 102 needs to detect one feature class (a feature category and a size thereof) at each sampling point at a time, the local receptive field structures of neurons of the feature detection layer are identical. Therefore, the memory 8 and the controller 6 can be used in common to determine the receptive field structures. That is, configuration bits or coupling weight data can be time-sequentially given to respective neurons of the feature detection layer.

In the case in which a FPGA is used, configuration bits simply determine a logical coupling (interconnection) structure. That is, configuration bits specify whether respective neurons are coupled with particular neurons in a layer at a preceding stage. Changing and setting of the weighting factor for each coupling to realize a required receptive field structure can be performed by changing the weight data of the synapse circuit in accordance with the weighting factor data supplied from the memory 8.

For example, when the synapse weight is given by the amount of a charge injected and stored in a floating gate, each synapse weight can be set by injecting an amount of charge corresponding to a weighting factor stored in the memory 8. In this case, the controller 6 reads synapse weight data (indicating an applied voltage necessary to achieve a specified amount of charge) from the memory 8 at a particular address, and the controller 6 sets the applied voltage in accordance with the synapse weight data.

The synapse elements $S_k$ (k=1, 2, . . . ) of the receptive field structure are time-sequentially accessed and the synapse weights thereof are set so as to obtain a specified distribution (receptive field structure). When a rewritable low-power memory device (such as a FeRAM) capable of storing data indicating the weighting factors for a necessary period of time is available, such a memory may be used for the above purpose.

Although the receptive field structure of each neuron in the feature detection layer is changed depending on the feature class, the receptive field structure of each neuron in the feature consolidation layer is not changed if the scale level of the feature class is maintained unchanged.

Fourth Embodiment

In a fourth embodiment described below, the synapse circuit that determines the receptive field structure is realized by a 2-dimensional systolic array processor, and the receptive field structure is changed by changing the time-sequential pipeline processing data supplied to the systolic array elements. A further detailed description of the systolic array may be found, for example, in "Architecture of parallel computers", Tomita, Shokodo, 1986, pp. 190–192, "Digital Neural Networks", S. Y, Kung, PTR Prentice Hall, Englewood Cliffs, 1993, pp. 340–361, or Japanese Patent No. 2741793.

Figure 9:
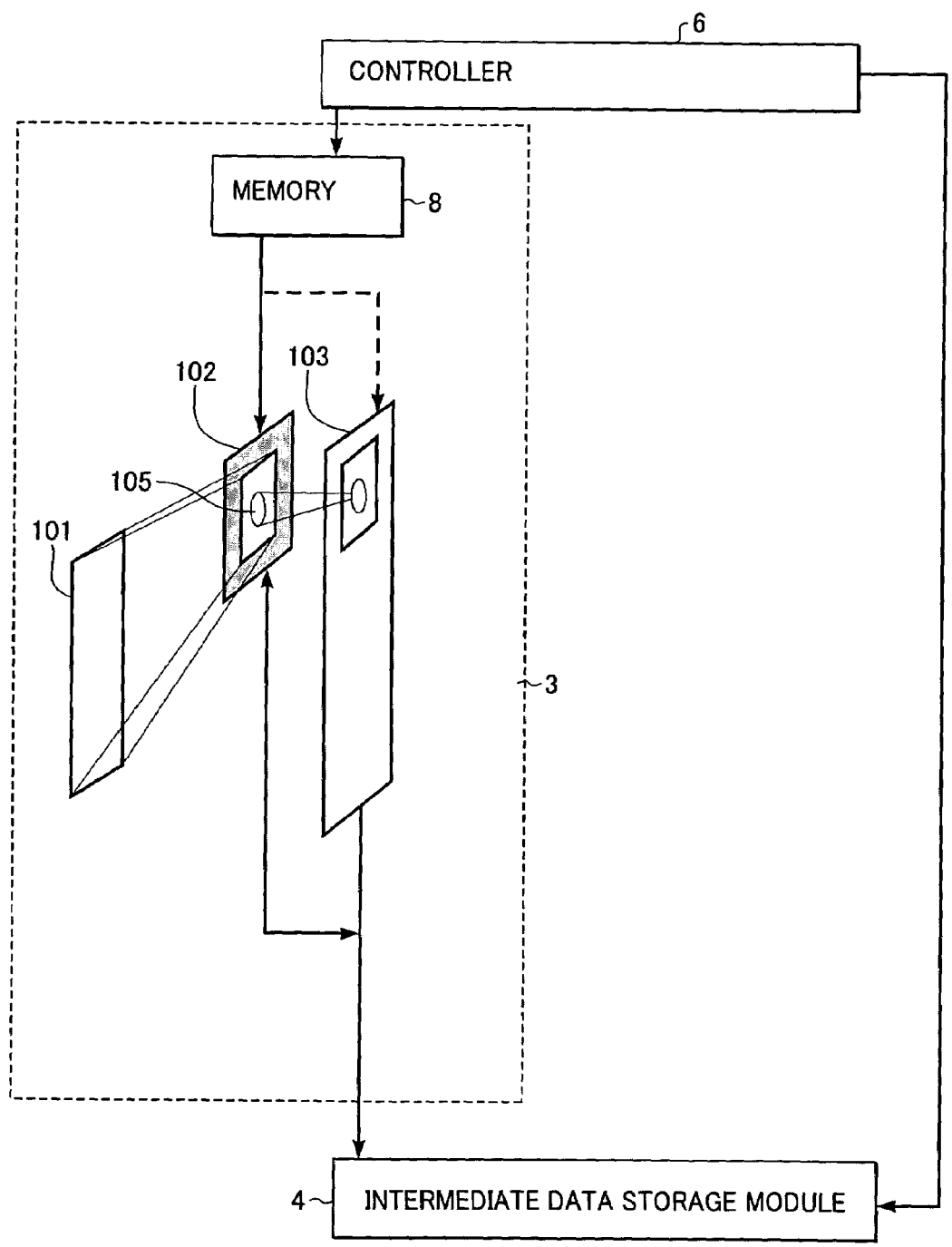
FIG. 9 is a diagram showing main parts of a fourth embodiment of the present invention.

FIG. 9 shows main parts of the fourth embodiment of the present invention. In this fourth embodiment, the receptive field structure is controlled dynamically and time-sequentially by time-sequentially supplying synapse weight data stored in the memory 8 to the respective synapse circuit elements in the systolic array structure in the feature detection layer 102 and the feature consolidation layer 103. When the synapse coupling weight data indicates analog voltages to be applied to the respective synapse circuit elements, the synapse circuit elements $S_k$ (k=1, 2, . . . ) such as those shown in FIG. 3A are sequentially accessed and the voltages indicated by the weight data stored in the memory 8 are applied thereto in a similar manner as in the third embodiment. Compared with the circuit configuration shown in FIG. 8, a great simplification in circuit configuration is achieved. If the systolic array processing is not performed, the configuration shown in FIG. 9 becomes substantially identical to the configuration shown in FIG. 1.

In synchronization with a timing control signal supplied from the controller 6 to the systolic array processor, outputs of the local area recognition module 3 (outputs from the feature consolidation layer) are consolidated by the data consolidator 430 in the intermediate result storage module 4, and the determination unit 5 determines whether there is a category to be detected. The processing performed by the intermediate result storage module 4 and the processing performed by the determination unit 5 are similar to those described earlier in the first embodiment, and thus a duplicated description is not given herein.

A process according to the present embodiment is described below with reference to a flow chart shown in FIG. 11. First, in step S1201, the controller 6 sets the feature detection layer number (for each order from the lowest order to the highest order) and the feature class (the category and the size). The setting is performed in accordance with a predetermined procedure.

In steps S1202 and S1203, a detection module in a feature detection layer inputs feature data or image data of a particular category, weighted depending on the receptive field structure, from the memory 8 or the data input layer 101. In step S1203, the controller 6 controls the operation of reading data from the memory 8 such that the receptive field structure is time-sequentially set by pipeline data that determines the synapse weights. The reading operation is controlled by the controller 6 depending on which hierarchical layer is formed in the local area recognition module. When a feature detection layer is formed, the controller 6 generates an address signal indicating an address of the memory 8 at which the synapse coupling weight data corresponding to a feature class to be detected is stored.

As in the previous embodiment, although the receptive field structure of each neuron in the feature detection layer is changed depending on the feature class, the receptive field structure of each neuron in the feature consolidation layer is not necessarily changed if the scale level of the feature class is maintained unchanged.

In step S1204, sub-sampling is performed (in the feature consolidation layer) on the outputs of the feature detection layer for each feature class, and data indicating the result (the data indicating the location and the detection level) is stored in the memory 8 at a particular address assigned depending on the feature class. Steps S1201 to S1204 are repeated time-sequentially for each feature category and each layer number. In step S1205, after completion of iteration of steps S1201 to S1204, data indicating the detection results associated with respective feature classes are read from the memory 410 in the intermediate result storage module 4, and a detection map of middle-order features or high-order features is generated. The memory 401 may be formed in a similar manner as in the first embodiment.

In step S1206, the determination unit 6 performs thresholding to finally determine whether there is a pattern of a particular category to be detected. If such a pattern is detected, the determination unit 6 outputs information indicating the location of the detected pattern.

Fifth Embodiment

Figure 12A:
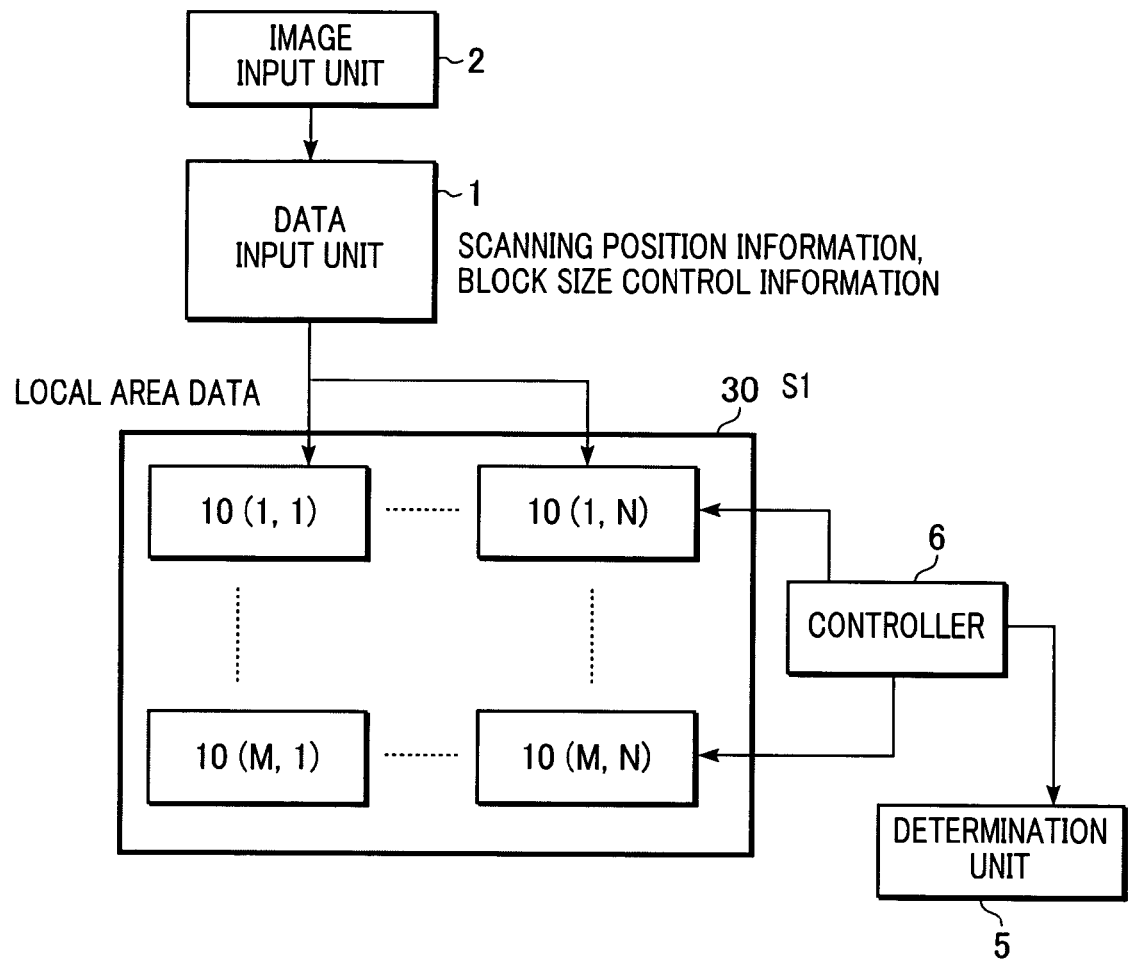
FIG. 12 is a diagram showing main parts of a fifth embodiment of the present invention.
Figure 12B:
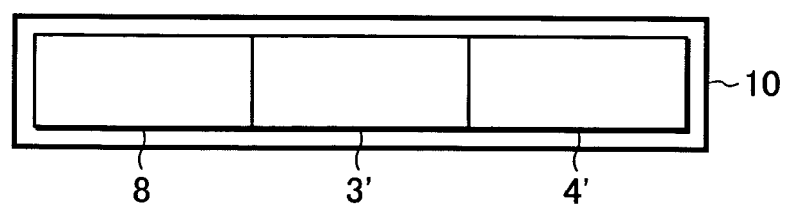

FIG. 12A shows a fifth embodiment in which a calculation parameter control data memory 8, a processing circuit 3' and an intermediate result storage module 4' are integrated into a single operation cell 10, and similar operation cells 10 are disposed in the form of an array thereby forming a local area recognition module 30. The operation of each operation cell 10 and also the operation of a data input unit 1 and a determination unit 5 are controlled by a controller 6.

The operation cell 10 are parts of the local area recognition module 3 corresponding to that according to the first to fourth embodiments, and one operation cell 10 corresponding to one operation unit. Data read from an intermediate result storage module 4' of an operation cell 10a is supplied to processing circuits 3' of a plurality of operation cells (10a, 10b, . . . ) including the operation cell 10a via coupling lines (not shown). Determination as to which operation cells should receive the data is made depending on the receptive field structure of neurons in a next hierarchical level (synapse coupling pattern).

In the present embodiment, as in the first embodiment, hierarchical parallel processing is achieved. The processing circuit 3' in the operation cell 10 performs processing associated with a neuron element (operation unit) in a feature class in a hierarchical level. One feature of the present embodiment is that the synapse coupling weight data and the intermediate result data are stored, in a distributed fashion, in the calculation parameter control data memory 8 and the intermediate result storage modules 4' associated with respective neuron elements (operation unit).

In the present embodiment, the memory 4 and the memory 8 are each formed of a ferroelectric memory (such as a FeRAM). The memory 4 may be either a digital memory or an analog memory. Because the memory 4 is used to temporarily store results, a capacitor (a ferroelectric capacitor, a capacitor using a high dielectric material, or a capacitor of the type used in CMOS circuits) may be used as the memory 4. As for the memory 8, it is desirable to use a nonvolatile memory.

The above-described configuration according to the present embodiment makes it possible to efficiently extract local features (patterns) with different sizes of the same category, using the simple circuit that needs low power consumption. Various feature classes can be detected using the same circuit by changing the receptive field structure depending on the feature class to be detected. This allows a great reduction in the circuit complexity.

Even in a case in which a part of a pattern to be detected is hidden behind another pattern, the pattern can be successfully detected by detecting and consolidating middle-order patterns obtained by processing low-order patterns or the output of the sensor.

Sixth Embodiment

Figure 13:
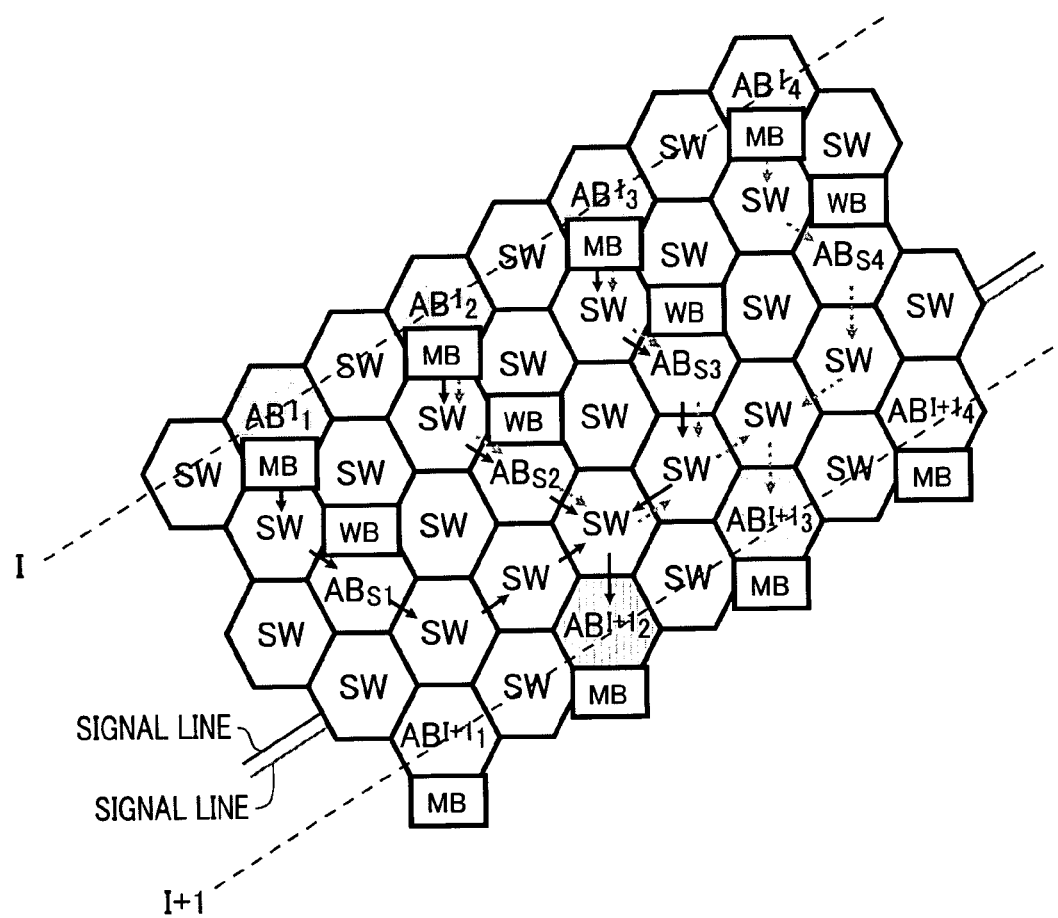
FIG. 13 is a diagram showing main parts of a processing circuit.
Figure 20:
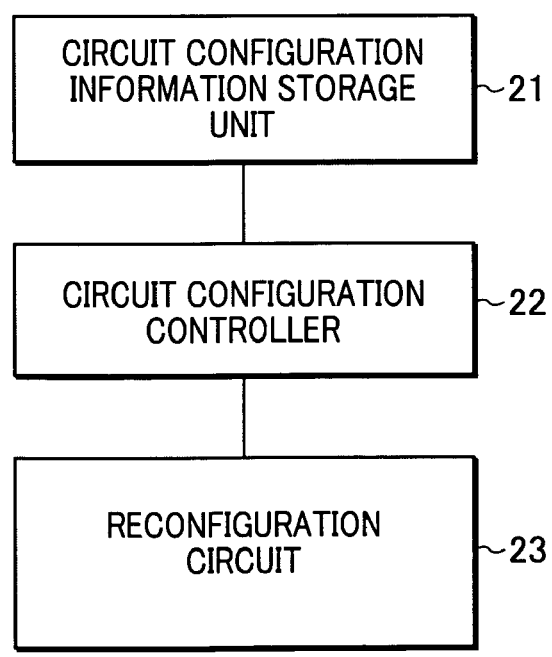
FIG. 20 is a diagram showing a general construction of a reconfigurable signal processing circuit.

FIG. 13 shows main parts of a reconfigurable processing circuit according to a sixth embodiment of the present invention. As shown in FIG. 20, this reconfigurable processing circuit 23 forms a signal processing circuit together with a circuit configuration information storage unit 21 and a circuit configuration controller 22.

In the reconfigurable processing circuit 23, as shown in FIG. 13, three types of processing element blocks of two types of analog processing blocks ($AB^I$ and $AB_S$), intermediate result memory blocks MB for temporarily storing results of processing performed by analog processing blocks ($AB^I$, $AB^{I+1}$, and so on) serving as neuron devices as will be described later, and calculation parameter control data memory blocks WB for storing calculation parameters associated with the analog processing blocks are disposed in the form of a lattice.

As for memory devices in each memory block MB, analog memories such as capacitors, and more preferably, capacitors using a ferroelectric material or a high dielectric material are used. Alternatively, digital memories such as SRAMs or FeRAMs may be used. Preferably, memory blocks WB are formed of nonvolatile memories such as FeRAMs, although SRAMs or similar memories may also be used.

The intermediate result memory blocks MB are disposed at distributed locations adjacent to respective analog processing blocks ($AB^I$, $AB^{I+1}$, and so on), and the calculation parameter control data memory blocks WB are disposed at distributed locations adjacent to respective analog processing blocks $AB_S$. As shown in FIG. 13, connections among blocks are realized using multiinput-multioutput switch blocks SW that are controlled by control signals supplied via control signal lines.

The control signal lines include switch block control lines (shown in FIG. 14 but not shown in FIG. 13) for controlling transmission of signals among blocks and for controlling the on/off patterns of switch blocks SW and analog processing block control lines (shown in FIG. 14 but not shown in FIG. 13) for controlling signal modulation parameters of analog processing blocks. Each type of control lines includes a clock signal line whereby control signals are digitally transmitted to blocks with specified clock timings.

Each analog processing block $AB^I$ serves as a neuron element in a hierarchical level I and each analog processing block $AB_S$ serves as a synapse element in a hierarchical level I described later. Each switch block is a circuit block that is digitally controlled in synchronization with a clock signal applied thereto. The analog processing blocks ($AB^I$ and $AB_S$) perform analog processing. The analog processing blocks ($AB^I$ and $AB_S$) are not necessarily needed to be formed of only analog circuit elements such as capacitors and resistors, but they may include a digital circuit element.

In FIG. 13, a neuron element $AB^{I+1}{}_3$ in a (I+1)th layer receives signals via three transmission paths: $AB^I{}_4 \rightarrow MB \rightarrow AB_{S4} \rightarrow AB^{I+1}{}_3$, $AB^I{}_3 \rightarrow MB \rightarrow AB_{S3} \rightarrow AB^{I+1}{}_3$, and $AB^I{}_2 \rightarrow MB \rightarrow AB_{S2} \rightarrow AB^{I+1}{}_3$. On the other hand, a neuron element $AB^{I+1}{}_2$ in the (I+1)th layer receives signals via three transmission paths: $AB^I{}_3 \rightarrow MB \rightarrow AB_{S3} \rightarrow AB^{I+1}{}_2$, $AB^I{}_2 \rightarrow MB \rightarrow AB_{S2} \rightarrow AB^{I+1}{}_2$, and $AB^I{}_1 \rightarrow MB \rightarrow AB_{S1} \rightarrow AB^{I+1}{}_2$. There is partial overlap between two signal paths. When a synapse element is included in common in two paths, the amount of analog modulation of that synapse element is generally different depending on the signal path. To make it possible for such a synapse element to perform a different amount of analog modulation depending on the signal path (that is, depending on the input signal), the synapse element is formed as shown in FIG. 15 (described in detail later).

The data stored in an intermediate result memory MB associated with an analog processing block $AB^{I+1}$ is read by the circuit configuration controller 2. When a next hierarchical level I+2 is realized, an analog processing block $AB^I$ shown in FIG. 13 becomes an analog processing block $AB^{I+2}$, and the output of the analog processing block $AB^{I+1}$ is read from the memory block MB and fed back to the analog processing block $AB^{I+2}$ via a feedback line (not shown).

Thus, even when there are a large number of hierarchical layers, processing can be performed using the reconfigurable processing circuit 3 including a small number of circuit elements forming one or two layers, because the circuit configuration is changed depending on the hierarchical level by reading circuit configuration information from the circuit configuration information storage unit 21 and loading the circuit configuration information into the respective calculation parameter control data memory blocks WB. By storing intermediate processing results in memories disposed at distributed locations, it becomes possible to make the problem associated with interconnection less serious, and thus it is possible to increase the integration density of circuit elements.

Figure 14:
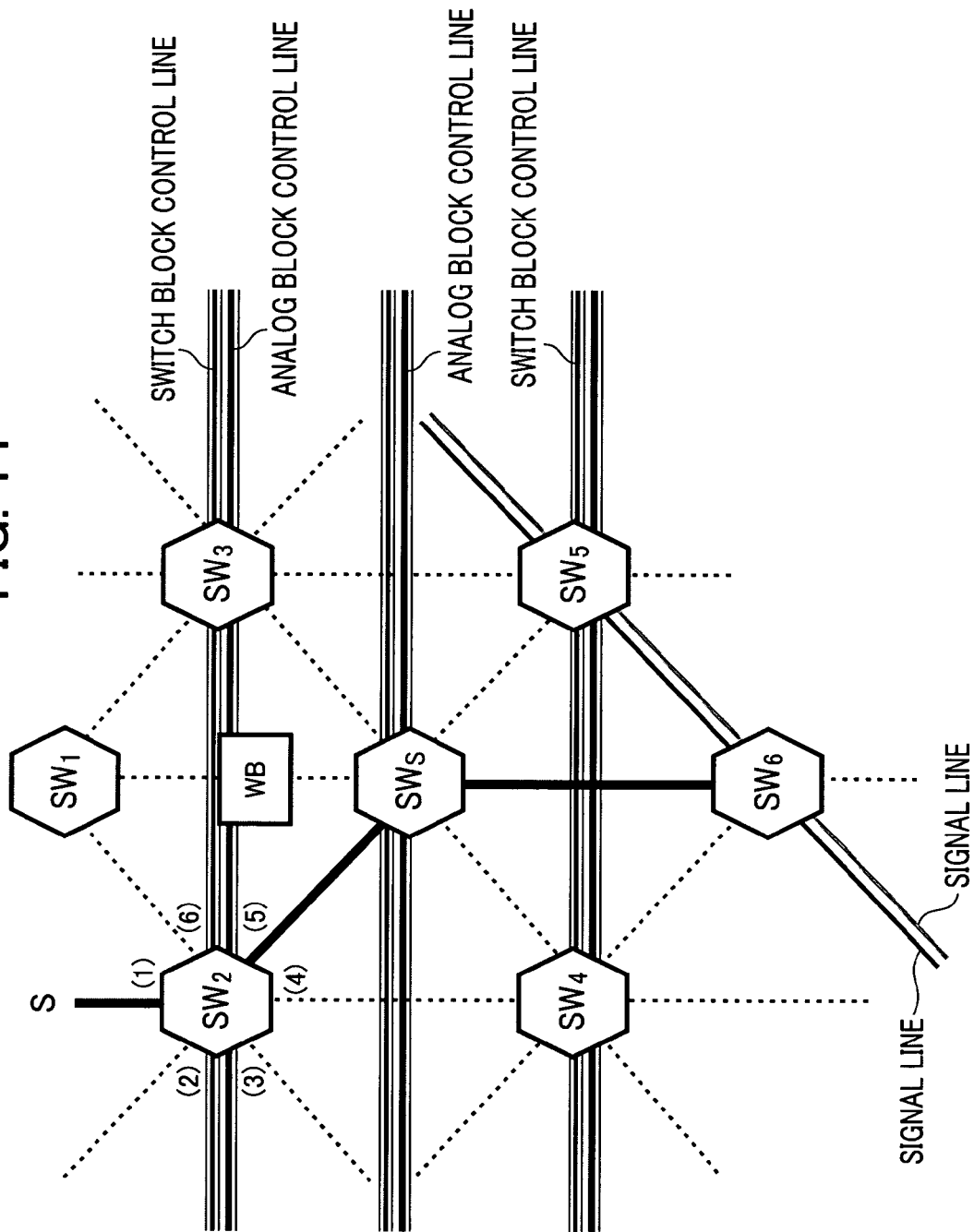
FIG. 14 is a diagram showing connections among basic element blocks in a reconfigurable signal processing circuit.

The circuit configuration controller 22 shown in FIG. 20 outputs control signals over the switch block control lines and the analog processing block control lines shown in FIG. 14. The control signals supplied via the switch block control lines control turning on/off of switching elements in the respective switch blocks SW. Some examples of manners of controlling turning on/off switching elements are shown in FIGS. 17 to 19. On the other hand, the control signal supplied via the analog processing block control lines control the signal modulation characteristic (for example, the amount of pulse phase modulation) of synapse elements or the characteristic of neuron elements, such as the time window width and/or the weighting function of time-window weighted integration.

The analog processing blocks AB ($AB^I$ and $AB_S$) are isposed such that each analog processing block is surrounded by switch blocks SW, and memory blocks MB for storing results of processing are disposed at locations adjacent to the respective analog processing blocks $AB^I$ serving as neuron elements.

In FIG. 14, each switch block SW is denoted by a regular hexagon to conveniently represent six directions (for example, as denoted by numerals (1) to (6) for a switch block $SW_2$) in which signals are input or output to or from each switch block SW. Note that the number of inputs/outputs of each switch block SW is not limited to six, and each switch block SW may be denoted by a polygon having as many sides as the number of inputs/outputs.

An example of a manner in which blocks are connected width each other is shown in FIG. 14. In FIG. 14, solid lines denote interconnection lines that are in a state in which signals can be transmitted between blocks (between a switch block and another switch block or between a switch block and an analog processing block), and broken lines denote interconnection lines that are in a state in which signals cannot be transmitted.

Turning on/off of each switch block SW in respective directions (six directions in the specific example shown in FIG. 14) is controlled by control signals supplied via switching control lines extending in a horizontal direction in FIG. 14, separately for the respective directions. Data indicating a plurality of on/off-state patterns of each switch block SW are stored in the memory (such as a SRAM, DRAM, FRAM, or MRAM) in the circuit configuration information storage unit 1, and the on/off pattern can be changed depending on processing to be performed.

Figure 17A:
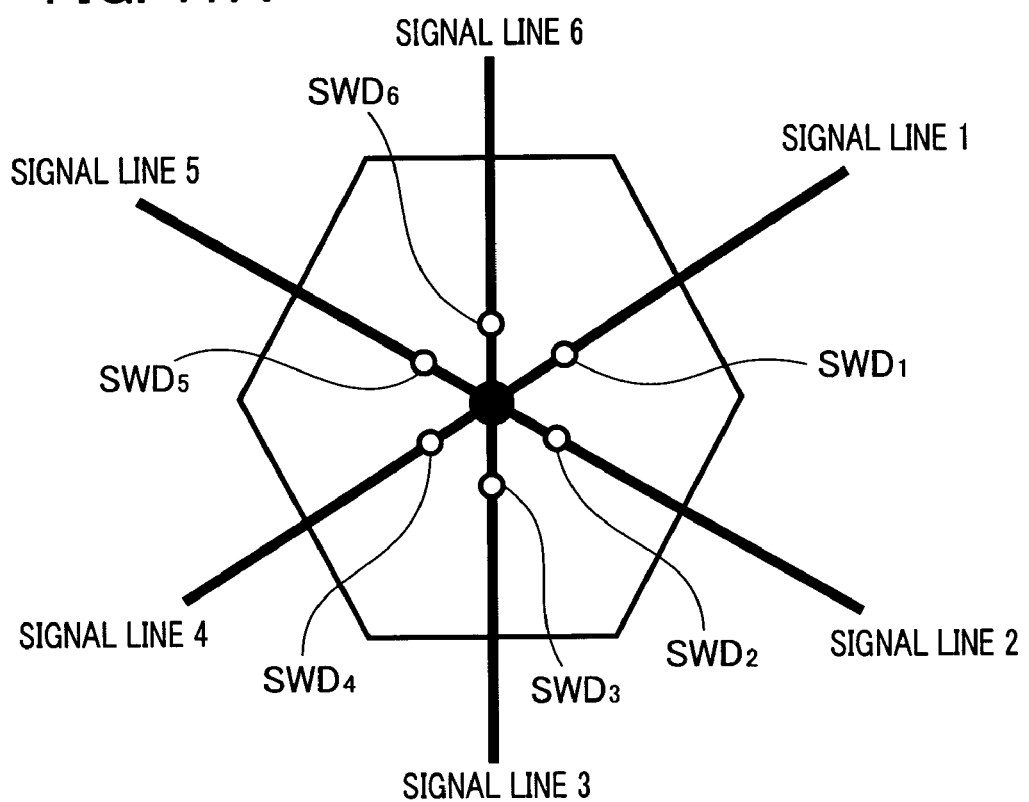
FIG. 17 is a diagram showing an example of a construction of a switch block.
Figure 17B:
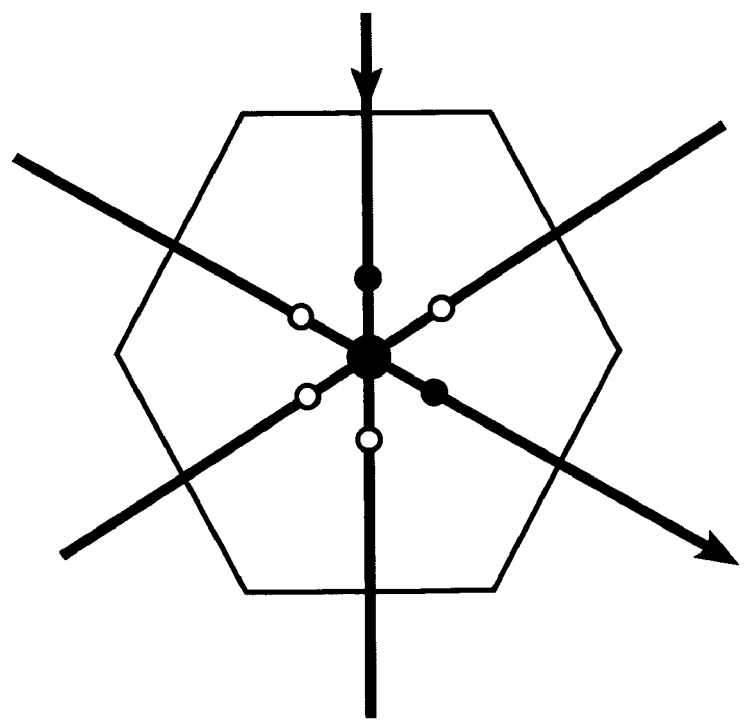
Figure 18A:
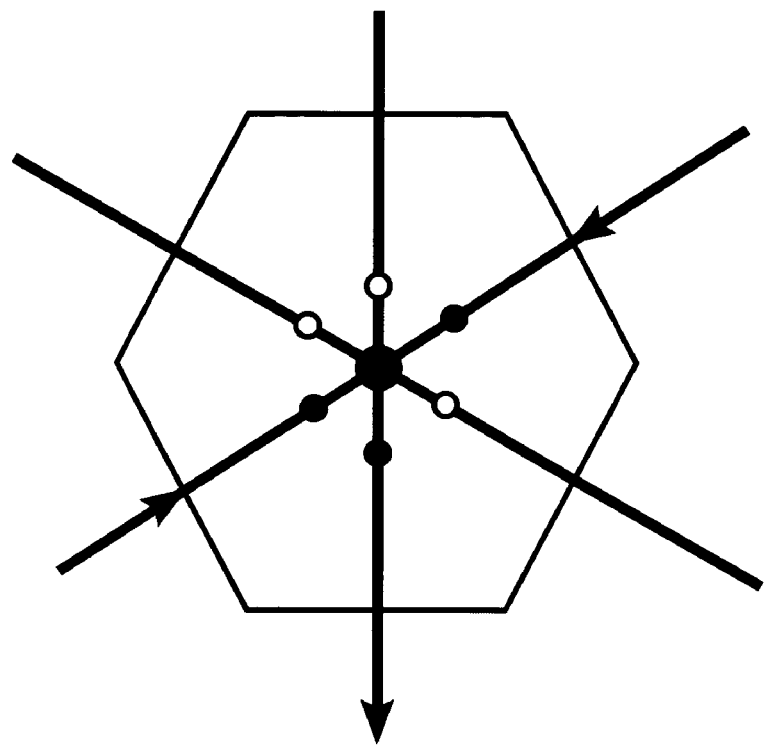
FIG. 18 is a diagram showing another example of a construction of the switch block.

FIG. 17A shows a structure of a switch block SW. In this example, six digital switching elements SWDj (j=1, 2, . . . , 6) are disposed in respective directions. It is possible to control the direction in which a signal is output by controlling the on/off pattern, for example, as shown in FIG. 17B (solid circles denote switches in the on-state, and open circles denote switches in the off-state). It is also possible to combine a plurality of input signals and output the combined signal into a particular direction by controlling the on/off pattern, for example, as shown in FIG. 18A.

Figure 18B:
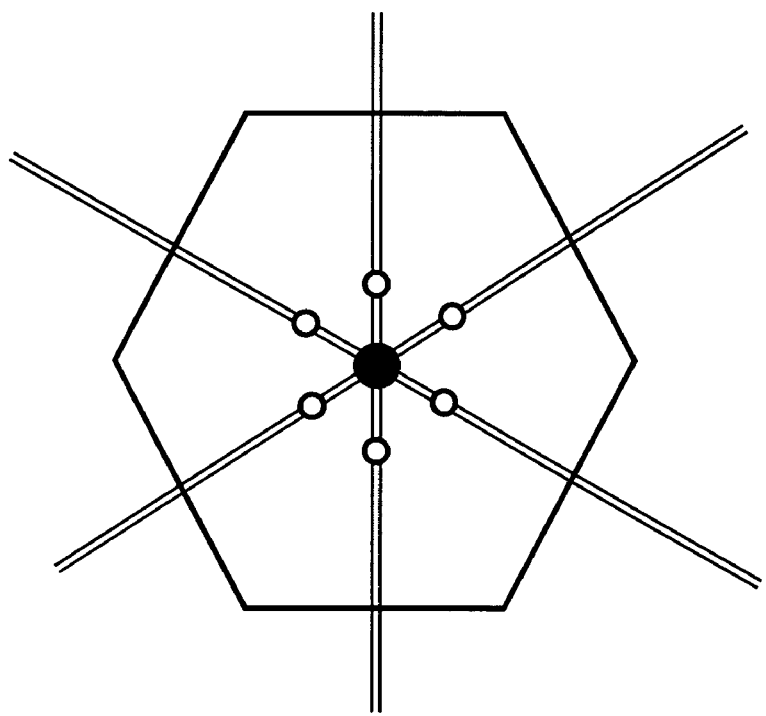
Figure 19:
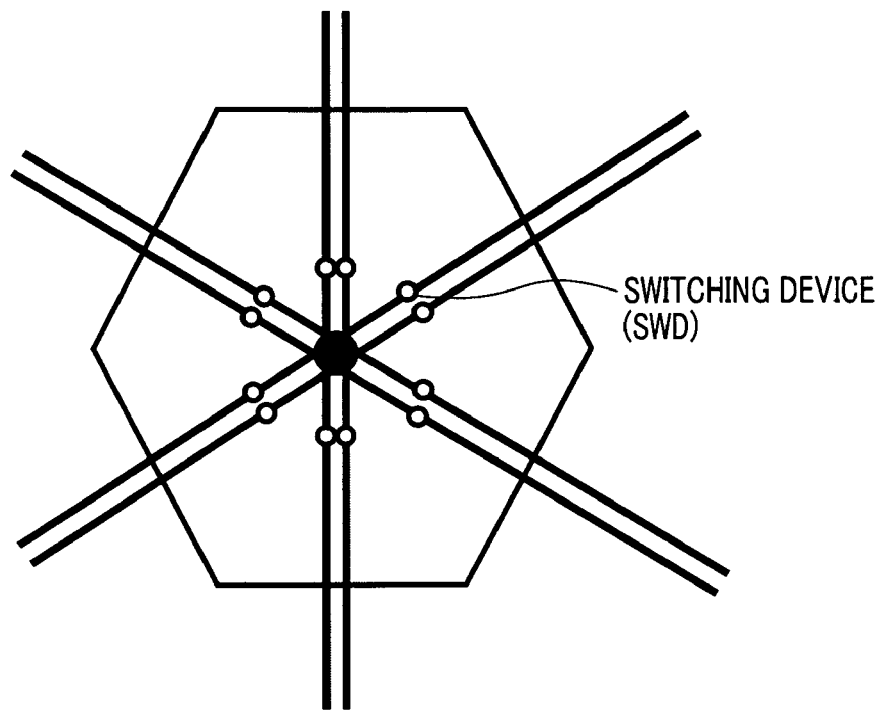
FIG. 19 is a diagram showing another example of a construction of the switch block.

As shown in FIGS. 18B and 19, a plurality of signal lines may be disposed in each direction. In the example shown in FIG. 18B, one switch element is assigned to a plurality of signal lines extending in the same direction. In the example shown in FIG. 19, one switch element SWD is assigned to each of signal lines extending in the same direction. A plurality of pulse signal flows can be controlled independently by using a single switch block SW. The on/off state of each switch element of each switch block is controlled by a control signal supplied via a switch block control line with predetermined clock timing.

In FIGS. 13 and 14, signal lines 1 and 2 are lines for transmitting signals analog-modulated by a synapse element $AB_S$ to a neuron element $AB^I$. This configuration corresponds to that obtained by the switch element shown in FIG. 18B is used in the switch block SW. More specifically, in FIG. 13, the signal line 1 serves to transmit a signal to a neuron element $AB^{I+1}{}_3$ and the signal line 1 serves to transmit a signal to a neuron element $AB^{I+1}{}_4$. Those signal lines are used as local common bus lines via which to transmit pulse-modulated signal.

Although only two signal lines are shown in FIG. 14 for convenience, a greater number of signal lines may be disposed. However, the increase in the number of signal lines results in an increase in area occupied by the signal lines. This causes a reduction in integration density. To avoid the above problem, the number of signal lines is limited to a particular range.

In some cases, a greater number of signal lines are needed than the upper limit, for example, as in the case in which signals output from s neuron elements in a Ith layer are input, after analog modulation is performed by different amounts by synapse elements, to n neuron elements n a (I+1)th layer via m (m>n) signal lines, wherein signal paths partially overlap with each other.

In such a case, interconnections can be realized by time-sequentially switching the on/off-state pattern of switch blocks SW connected to neuron elements $AB^I$. In the technique, the amount of modulation performed by an analog modulator (described later) in each analog processing block $AB_S$ serving as a synapse element is also changed according to a control signal supplied from the circuit configuration controller 2 via an analog block control line (FIG. 14).

The functions of the respective blocks of the signal processing circuit according to the present embodiment are described below. Each switch block SW controls the flows of signals output from analog processing blocks ($AB^I$, $AB_S$) connected to the switch block SW such that signals output from neuron elements in a specified particular area (called a "receptive field") in a lower hierarchical level to a neuron element in a higher hierarchical level. The coupling structure in the receptive field can be arbitrarily set by controlling the on/off patterns of switch blocks SW.

Data indicating the synapse coupling weights in a particular receptive field is stored in an associated calculation parameter control data memory block WB, wherein the synapse coupling weights can be arbitrarily set by setting the parameters of modulators in an analog processing block that will be described in detail later.

By storing synapse coupling weight information or interconnection information in digital memories in the above-described manner, it becomes unnecessary to frequently perform memory access. This is very advantageous in achieving high-speed parallel processing. Furthermore, it is possible to modify or extend the circuit configuration depending on processing to be performed (that is, depending on a feature class to be extracted).

Each analog processing block $AB_S$ is a multiinput-multi-output circuit element capable of modulating input signals by amounts that can be set independently in accordance with synapse weights. More specifically, each input signal is multiplied by a specified synapse weight and a signal indicating the sum of products is output (in embodiments described later, input signals are phase-modulated, and a resultant signal is output). As shown in FIG. 15, each analog processing block $AB_S$ includes a plurality of analog modulators for performing analog modulation corresponding to synapse weights.

Each analog processing block $AB_S$ is capable of setting areas of neurons such that signal output from neurons in an input area J are input to the analog processing block $AB_S$ and signals output from the analog processing block $AB_S$ are supplied to neurons in an output area I. Each analog processing block $AB_S$ includes a plurality of analog modulators for performing modulation by amounts corresponding to synapse weights determined by addresses of neurons in the output area and addresses of neurons in the input area. Examples of structures of the analog processing block $AB_S$ are shown in FIGS. 15A and 15B.

Figure 15A:
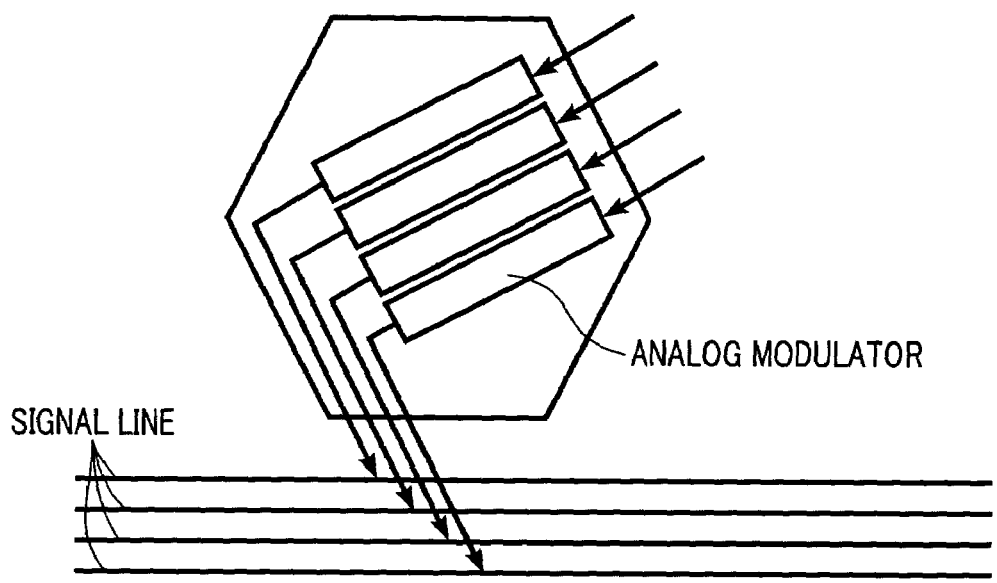
FIG. 15 is a diagram showing an analog processing block serving as a synapse.

In the example shown in FIG. 15A, the analog processing block $AB_S$ serves as a synapse element including as many analog modulators as there are output lines (input lines). Although analog block control lines are not shown in FIGS. 15A and 15B for simplicity of illustration, the amount of modulation (the amount of pulse phase modulation (the amount of delay) or the amount of pulse width modulation in this specific embodiment) of each analog modulator is set or changed via a corresponding control line.

Figure 15B:
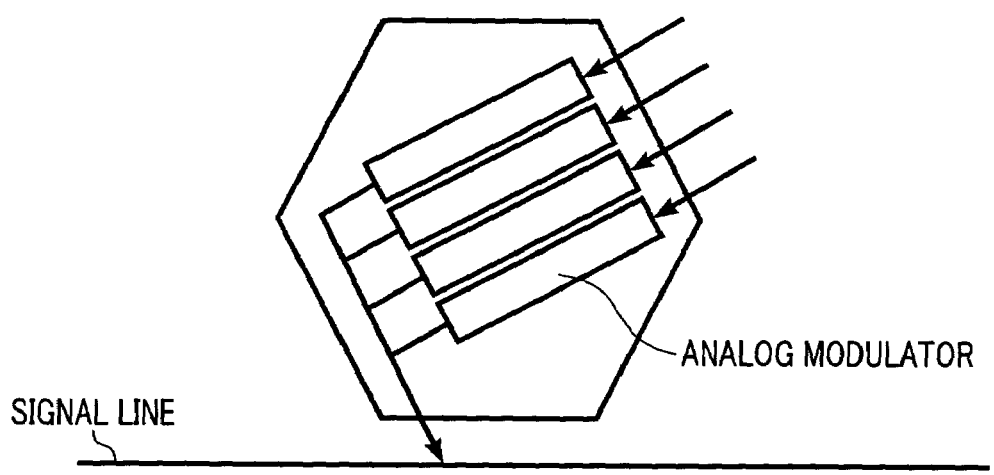

In the example shown in FIG. 15B, the analog processing block $AB_S$ serves as a synapse element having a plurality of inputs and a single output. When a plurality of neuron elements in a higher layer receive signals output from neurons in a lower layer by means of time-division multiplexing wherein some neurons in the lower layer are associated with different neurons in the higher layer, the analog processing block $AB_S$ shown in FIG. 15B is used as a synapse element for performing analog modulation on a plurality of signals by different amounts depending on a neuron in the higher layer.

For example, in FIG. 13, a signal transmission path from a neuron element $AB^I_3$ in a Ith layer to a neuron element $AB^{I+1}_3$ in a (I+1)th layer (the path is denoted by a broken line) and a signal transmission path from the neuron element $AB^I_3$ a neuron element $AB^{I+1}_2$ (the path is denoted by a solid line) both pass through a synapse element $AB_{S3}$.

In the synapse element $AB_{S3}$, parameters associated with respective modulators are set such that the amounts of modulation (pulse phase modulation, pulse width modulation, or the like) vary depending on the transmission path (or depending on the address of a neuron in the higher layer).

Thus, the analog processing block $AB_S$ configured in the above-described manner can be used to transfer signals even in a case in which receptive field structures of nearby neurons partially overlap with each other. This allows reductions in the number of interconnection lines among circuit elements of a neural network and the number of circuit elements.

In the case in which pulse phase modulation is employed as the analog modulation described above, the amount of modulation can be controlled by controlling the amount of charge applied to a capacitor included in a synapse circuit. More specifically, in an analog processing block $AB_S$, a specified amount of change can be applied to a floating gate element or a capacitor of each modulator via a corresponding analog processing block control line (FIG. 14A).

The circuit configuration controller 22 shown in FIG. 20 reads synapse weight data (indicating applied voltages corresponding to specified amounts of charge) from the circuit configuration information storage unit 1 and injects currents into floating gate elements or capacitors until as much charge as specified by the corresponding synapse weight is stored in each floating gate element or capacitor. The injection of currents is performed while time-sequentially accessing synapse circuit elements $AB_{Sk}$ (k=1, 2, ...) such that the synapse circuit elements $AB_{Sk}$ (k=1, 2, ...) form a receptive field structure having a specified synapse weight distribution. When a rewritable memory device (such as a MRAM or a FeRAM) capable of storing weight data for a necessary period of time is available, such a memory may be used for the above purpose.

Using the reconfigurable processing circuit shown in FIG. 13, a neural network for performing pattern recognition by means of parallel hierarchical processing can be realized as described below. First, referring to FIG. 2, processing performed by the neural network is described in detail. This neural network deals with information in a local area of input data so recognize a subject or a geometric feature by means of hierarchical processing. The basic structure of this neural network is a convolutional network structure (LeCun, Y., and Bengio, Y., "Convolutional Networks for Images Speech and Time Series" in Handbook of Brain Theory and Neural Networks (M. Arbib, Ed.), MIT Press, 1995, pp. 255–258). Information indicating the category and the location of a recognized pattern is output as a recognition result from the final layer (the highest layer).

A data input layer 101 is a layer for inputting local area data from a photoelectric conversion device such as a CMOS sensor or a CCD sensor under the control of a scanning unit 1. A first feature detection layer (1, 0) detects as many local features (which may include not only a geometric feature such as a component in a particular direction or a component with a particular spatial frequency but also a color feature) as there are feature categories from an image pattern input via the data input layer 101, in local areas centered at respective specified points (or sampling points) over the entire frame of image, for a plurality of scale levels or for a plurality of resolutions at each point. For the above purpose, the feature detection layer (1, 0) is formed of neuron elements each of which has a receptive field structure determined depending on a feature class to be detected (for example, the direction of a line to be detected as a geometric feature) and which generates a pulse signal corresponding to the feature detection level.

A feature consolidation layer 103 (2, 0) is composed of neuron elements each of which has a particular receptive field structure (the term "receptive field" is used to describe a coupling range of output devices in a preceding layer, and the term "receptive field structure" is used to describe coupling weights assigned to the respective output devices), and outputs a pulse train. The feature consolidation layer 103 (2, 0) combines outputs of neuron elements in the same receptive field in a feature detection layer 102 (1, 0) (by means of determining the average of outputs of neuron elements in a local area or performing sub-sampling to determine a maximum output in the local area). The receptive fields of the respective neurons in the feature consolidation layer have the same structure.

The following feature detection layers 102 ((1, 1), (1, 2), ..., (1, M)) and the feature consolidation layers 103 ((2, 1), (2, 2), ..., (2, M)) respectively have their own receptive field structures. As with each layer described earlier, the feature detection layers 102 ((1, 1), (1, 2), ..., (1, M)) in respective feature detection modules detect different features, and the feature consolidation layers 103 ((2, 1), (2, 2), ..., (2, M)) consolidate the features detected by feature detection layers at previous stages. Note that coupling (interconnections) is made so that outputs from cells in a feature consolidation layer at a previous stage are input to a feature detection layer in the same channel. The feature consolidation layer performs sub-sampling to average the outputs from feature detection cells in a local area (a local receptive field of a neuron in the feature consolidation layer) associated with the feature category.

In the case in which the hierarchical parallel structure is realized by the structure shown in FIG. 13, each analog processing block $AB_S$ serves as a synapse, and each analog processing block $AB^I$ serves as a neuron element in the Ith layer.

Figure 16:
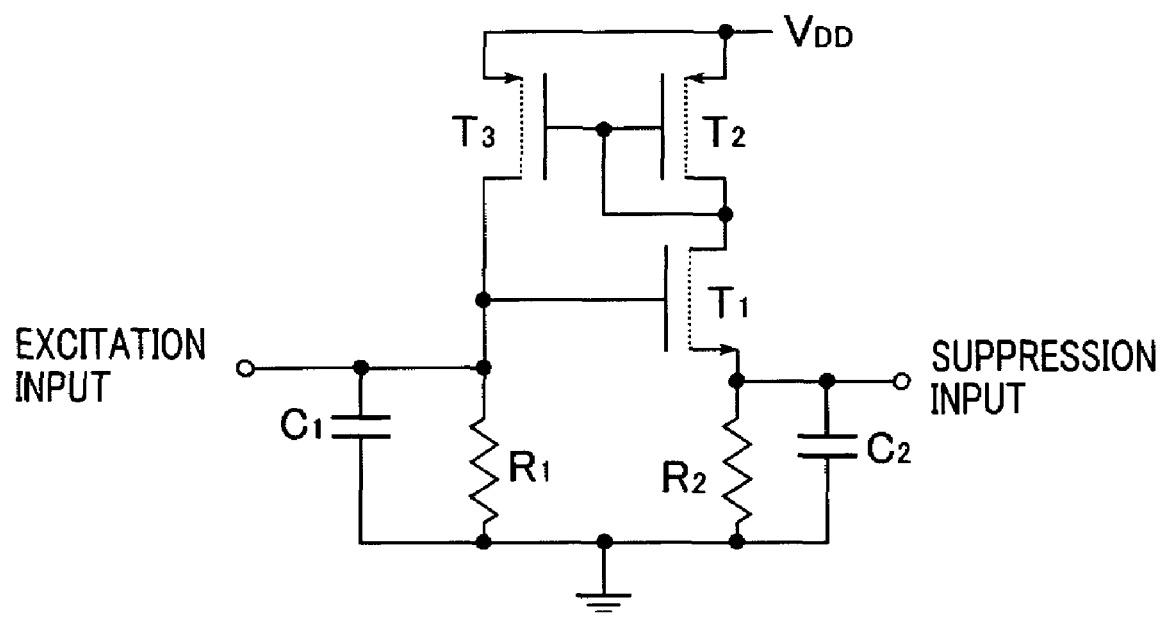
FIG. 16 is a diagram showing a synapse and a neuron element.

FIG. 16 shows connections in terms of outputs of neurons ($n_i$) of feature consolidation cells (feature detection cells) that form a receptive field of a certain feature detection cell (a certain feature consolidation cell) (wherein, when viewed from that certain cell, the outputs of those neurons ($n_i$) can be regarded as inputs to that certain cell). Of the signal transmission lines, a part represented by a thick line in FIG. 16 is a common local bus line for time-sequentially transmitting pulse signals output from a plurality of neurons.

In each synapse coupling element S, excitation coupling causes a pulse signal to be amplified, and suppression coupling causes a pulse signal to be attenuated. In the case in which information is transmitted by a pulse signal, amplification and attenuation can be achieved by any one of amplitude modulation, pulse width modulation, phase modulation, and frequency modulation. In the present embodiment, each synapse coupling element S operates as a phase modulation element by which amplification of a signal is converted into an advance in pulse arrival time corresponding to a feature, while attenuation is converted into a delay. That is, the synapse coupling element advances or delays, by an amount depending on a feature, the arrival time (phase) at which a signal arrives at a neuron connected to an output of the synapse coupling element. Qualitatively, excitation coupling causes an arrival pulse to be advanced in phase with respect to reference phase, while suppression coupling causes the arrival pulse to be delayed.

In FIG. 3A, each neuron element $n_j$ is of the integrate-and-fire type that outputs a pulse signal (spike train). The analog processing block $AB^I$ serving as a neuron circuit is described below. Each neuron element is based on an extension model of the integrate-and-fire neuron model. Each neuron device operation in a similar manner to an integrate-and-fire neuron in that the neuron fires and outputs a pulse signal when a value obtained as a result of linearly adding input signals (pulse train corresponding to action potential) that are temporally and spatially distributed.

FIG. 16 shows an example of a basic configuration of a pulse generator (using a CMOS circuit) serving a neuron element. This circuit is realized by extending a known circuit (IEEE Trans. on Neural Networks Vol. 10, p. 540) such that the circuit has the capability of performing weighted integration of an input pulse signal within a time window (a method of detecting a high-order feature by means of time-window weighted integration is disclosed in U.S. Patent Application No. 2002-0038294 filed by the present applicant). This circuit is configured such that the circuit can accept an excitation input and a suppression input.

A technique of controlling the operation (in particular, in terms of the timing of firing) of each neuron device is not essential to the present invention, and thus a further detailed description thereof is not given herein.

Transmission of pulse signals among neurons may be performed, for example, on the basis of a technique known as a AER (Address Event Representation) method (Lazzaro, et al, "Silicon Auditory Processors as Computer Peripherals", In Tourestzky, D. (ed), Advances in Neural Information Processing Systems 5, 1993, San Mateo, Calif., Morgan Kaufmann Publishers) or on the basis of other technique such as that disclosed in U.S. patent application Ser. No. 2002-0038294. Those techniques can be advantageously employed to transmit pulse signals output from a plurality of neurons via a common local bus as shown in FIG. 3A.

The pattern recognition apparatus descried above may be advantageously installed on a camera or other image input units. The pattern recognition apparatus may also be advantageously installed in an image output device such as a printer or a display. Use of the pattern recognition apparatus makes it possible to recognize or detect a particular subject and perform a particular operation in accordance with the detected subject, using a simple circuit with low power consumption. For example, the pattern recognition apparatus may be installed in an image input unit to detect a subject and perform or control focusing, exposure, zooming, and/or color correction or the detected subject. In the case in which the pattern recognition apparatus is installed in an image output device, optimum color correction for a particular subject may be automatically performed.

Seventh Embodiment

Figure 21:
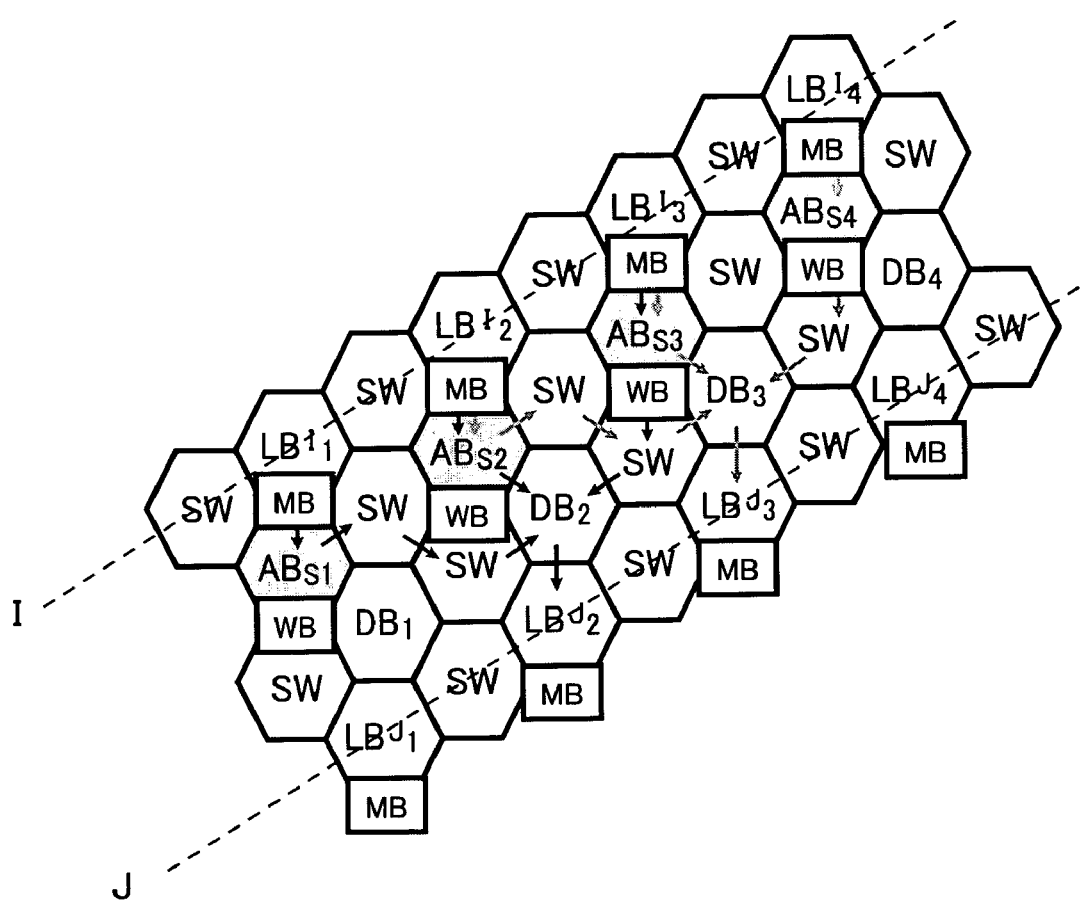
FIG. 21 is a diagram showing main parts of a processing circuit.

FIG. 21 shows another example of a configuration of a hierarchical neural network realized by a reconfigurable analog-digital hybrid circuit, which is an alternative of the hierarchical neural network for pattern recognition shown in FIG. 14. The present embodiment is similar to the first embodiment in that pulse signals are phase-modulated by synapse circuits (analog processing blocks) depending on a category to be detected such that features of various orders from the lowest order to the highest order are detected in a hierarchical manner.

This signal processing circuit includes analog processing blocks $AB_S$ serving as synapse elements, digital processing blocks DB for producing a phase delay in a pulse signal, switch blocks SW for changing the receptive field structure (local coupling structure among neurons), logical processing blocks LB (each of which is a part of a neuron element) for outputting a signal in accordance with outputs from analog processing blocks ABSk (k=1, 2, . . . ), intermediate result memory blocks MB for storing the outputs from the logical processing blocks, and calculation parameter control data memory WB for storing calculation parameter control data associated with the digital processing blocks DB.

Figure 24:
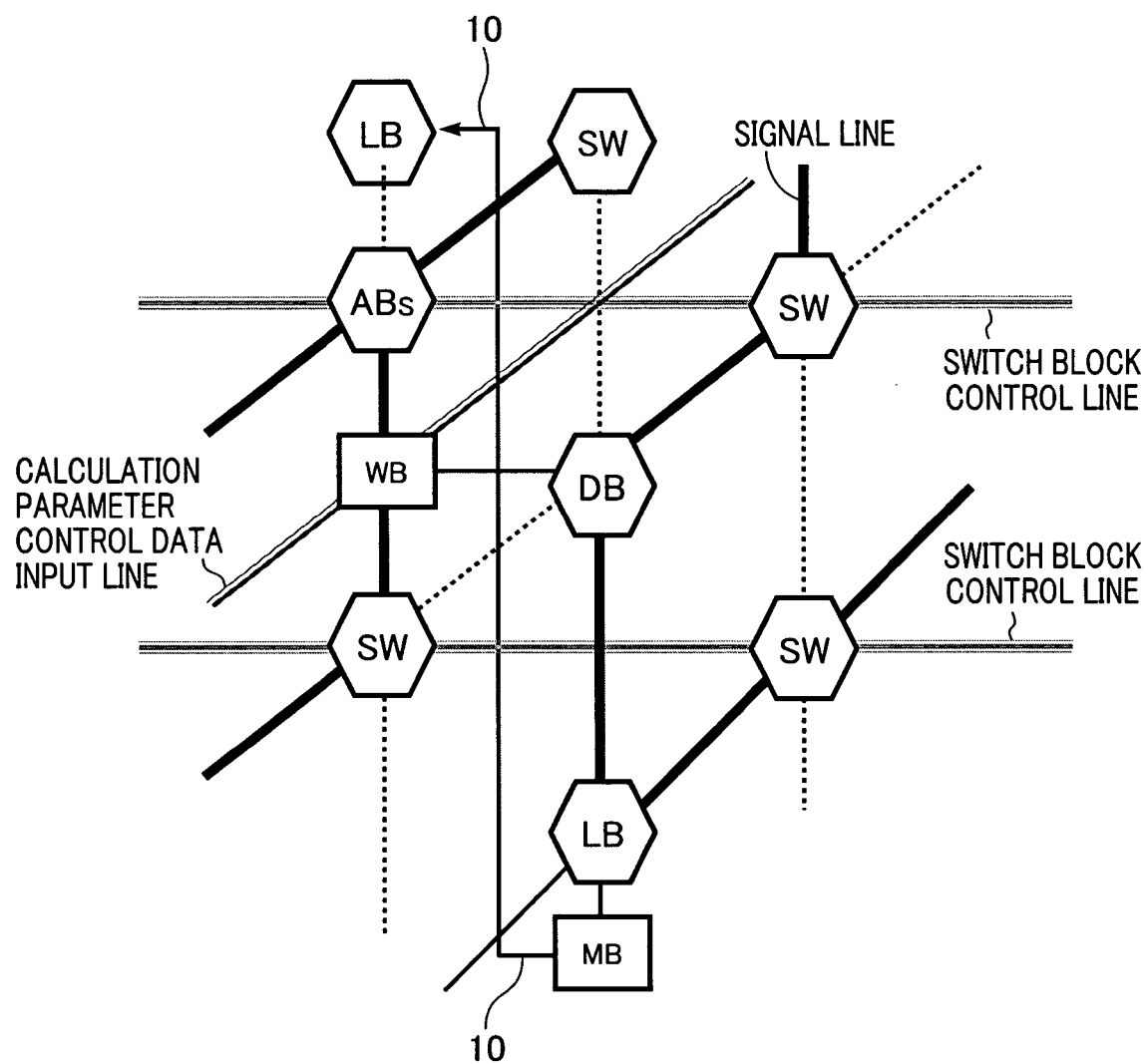
FIG. 24 is a diagram showing connections among basic element blocks in a reconfigurable signal processing circuit.

One intermediate result memory block MB is disposed adjacent to each logical processing block LB, and one calculation parameter control data memory WB is disposed adjacent to each digital processing block DB. As shown in FIG. 24, data read from a memory block MB is input to a logical processing block LB via a feedback line 10 to perform processing in a next hierarchical level.

When the processing in the next hierarchical level is performed, the circuit configuration controller 22 inputs synapse coupling weight data corresponding to the next hierarchical level into the calculation parameter control data memory WB or inputs a read address control signal to the memory WB to read synapse coupling weight data corresponding to the next hierarchical level. The total structure of the signal processing circuit further including a circuit configuration information storage unit 21 and a circuit configuration controller 22 according to the present embodiment can be configured as shown in FIG. 20 in a similar manner as in the sixth embodiment.

In the hybrid circuit according to the present embodiment, not only analog circuit elements but also logical processing elements and other digital circuit elements are disposed at distributed locations in the above-described manner. This makes is possible to achieve stable operation even in a large-scale circuit without being influenced by variations in characteristics of analog processing elements, because digital circuit elements delete influences of variations in characteristics of analog processing elements.

As in the sixth embodiment described above, as for memory devices in each memory block MB, analog memories such as capacitors are used. More preferably, capacitors using a ferroelectric material or a high dielectric material are used. Alternatively, digital memories such as SRAMs or FeRAMs may be used. Preferably, memory blocks WB are formed of nonvolatile memories such as FeRAMs, although SRAMs or similar memories may also be used.

Figure 22:
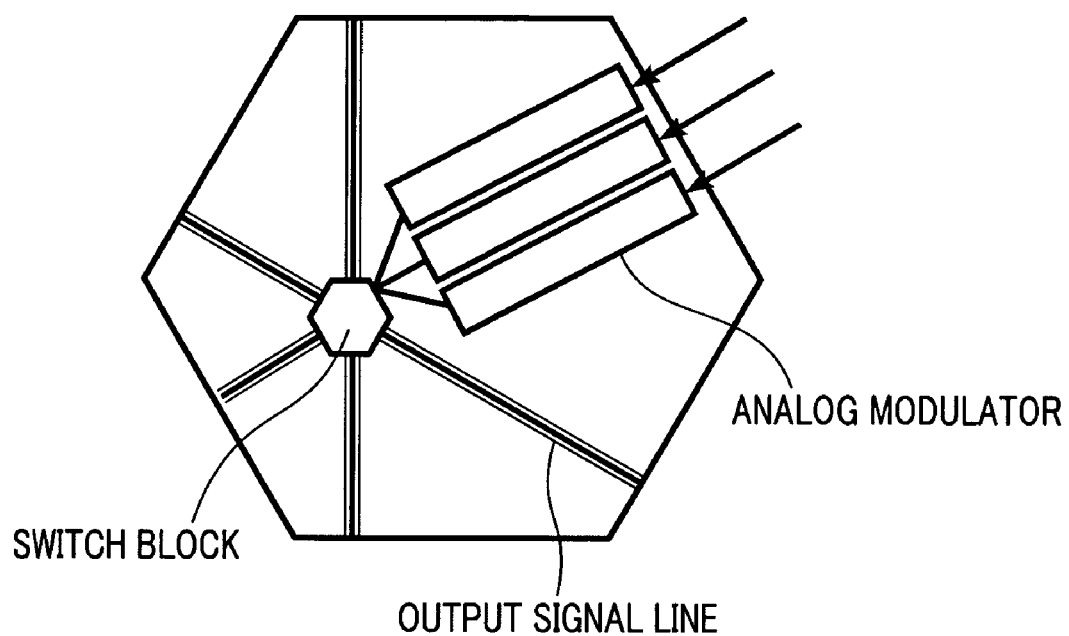
FIG. 22 is a diagram showing an analog processing block serving as a synapse.

In FIG. 21, a neuron element $LB^J_3$ in a Jth layer receives signals from neuron elements in a Ith layer (J>I, (in most cases, J=I-1)) via three transmission paths described below:

$LB^I_4 \rightarrow AB_{S4} \rightarrow SW \rightarrow DB_3 \rightarrow LB^J_3$
$LB^I_3 \rightarrow AB_{S3} \rightarrow DB_3 \rightarrow LB^J_3$
$LB^I_2 \rightarrow AB_{S2} \rightarrow SW \rightarrow DB_3 \rightarrow LB^J_3$ On the other hand, a neuron element $LB^J_2$ in the Jth layer receives signals from neuron elements in the Ith layer via three transmission paths described below:

$LB^I_3 \rightarrow AB_{S3} \rightarrow SW \rightarrow DB_2 \rightarrow LB^J_2$
$LB^I_2 \rightarrow AB_{S2} \rightarrow DB_2 \rightarrow LB^J_2$
$LB^I_1 \rightarrow AB_{S1} \rightarrow SW \rightarrow DB_2 \rightarrow LB^J_2$ Those two sets of three signal paths are partially overlapped with each other. That is, a synapse element $AB_S$ is included in both sets of signal paths. However, as in the first embodiment, the amount of analog modulation performed by the synapse element included in both sets of signal paths is generally different depending on the signal path. Each synapse element $AB_S$ has not only the capability of modulating signals input via a plurality of paths (signal lines) but also the capability of outputting a signal to one or more selected paths (directions). In the present embodiment, for the above purpose, each analog processing block $AB_S$ serving as a synapse element is configured as shown in FIG. 22. That is, in the example shown in FIG. 22, the analog processing block $AB_S$ includes three input terminals for independently receiving three input signals, three analog modulators, and one switch element. Signals output from the analog modulators can be output into arbitrary one or more of five directions via the switch element.

Figure 23:
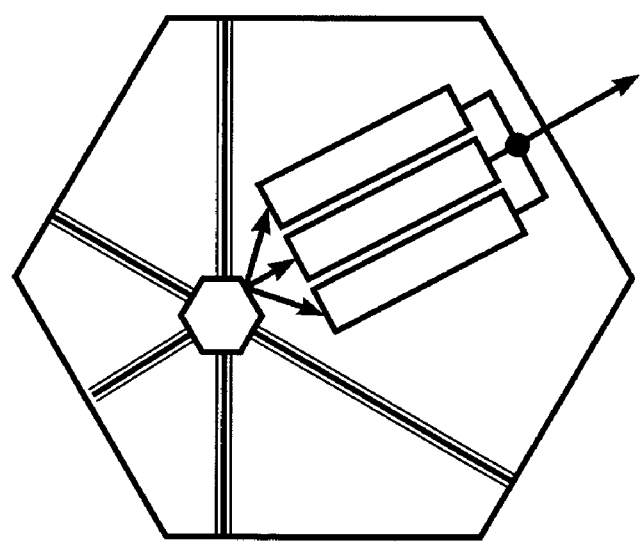
FIG. 23 is a diagram showing a digital processing block according to a second embodiment of the present invention.

FIG. 23 shows an example of a construction of a digital processing block DB according to the present embodiment. In this example shown in FIG. 23, the digital processing block DB includes three delay elements and one switch block. The switch block is different from the switch block SW shown in FIG. 15 in that it time-sequentially changes the output direction in which a signal is output. The signals output from the three delay elements are combined together and output over one signal line.

In the analog processing block $AB_S$ serving as a synapse, as in the first embodiment, when a pulse signal is input, the input signal is subjected to pulse phase modulation (or is delayed in time) and the resultant signal is output. The amount of modulation (or the amount of delay) is controlled in accordance with data read from an associated calculation parameter control data memory WB. Also in the digital processing block DB that produces a time delay, the amount of delay is controlled in accordance with data read from an associated calculation parameter control data memory WB.

In the present embodiment, the function of a neuron element to consolidate detected signals of a low-order category is realized by a logical processing block LB. That is, the logical processing block LB forms a part of a neuron element circuit, wherein the logical processing block includes a combinational logic circuit for determining, by examining combinational list-structured data described in the form of a list or a dictionary, whether a combination of input signals corresponds to a category to be recognized, and also includes an output circuit (including a flip-flop and a logic circuit) for outputting a recognition (detection) signal.

In its simplest form, input signals are phase-modulated by a synapse circuit as in the first embodiment, and a plurality of pulse trains each indicating different feature categories are input to a logical processing block, which calculates the AND of the input pulse trains. In the present embodiment, before the AND operation is performed by the logical processing block LB, the respective input pulses are delayed by particular amounts by the delay elements (digital circuit elements) in the digital processing block DB so that the input pulses arrive at substantially the same time.

For example, when a pulse signal associated with a certain category is predicted to arrive at time $t_n$ with respect to a reference time when the pulse signal is not subjected to a further delay, the delay element delays the pulse signal by T−$t_n$ (T>$t_n$). Because the amounts of delay are digitally determined, there can be a slight difference in the arrival time of pulse signals output from the delay elements. The resolution of the delay is set such that the maximum difference in arrival time becomes less than one-half the pulse width.

In the case in which pulse signals modulated by synapse elements are input to the logical processing block via a common bus as in the sixth embodiment, the amounts of delay produced by the delay elements are switched (modulated) depending on the input pulses, and the resultant pulse signals are input a multiinput/single-output AND circuit via a multiplexer.

By using the neural network realized by the reconfigurable analog-digital hybrid circuit described above, a high-order feature can be detected from a list-structured data indicating low-order features by means of a simple AND operation. However, in this technique based on the simple AND operation, a high-order feature is detected only when data indicating all low-order features associated with that high-order feature are input. To avoid the above problem, the logical circuit may be configured such that when the number of detected low-order features is greater than a predetermined value (in ratio), a corresponding high-order feature is regarded as being detected. This can be accomplished, for example, as follows. That is, when a high-order feature including M low-order features is detected from N low-order feature data extracted at particular spatial locations, pulse signals, which can be one of combinations whose number is given by $_MC_n(=M!/(M-N)!N!)$ (where m!=m(m−1) . . . 2·1), are input to AND circuits having N inputs and one output, and the OR of the outputs thereof is calculated.

Figure 25:
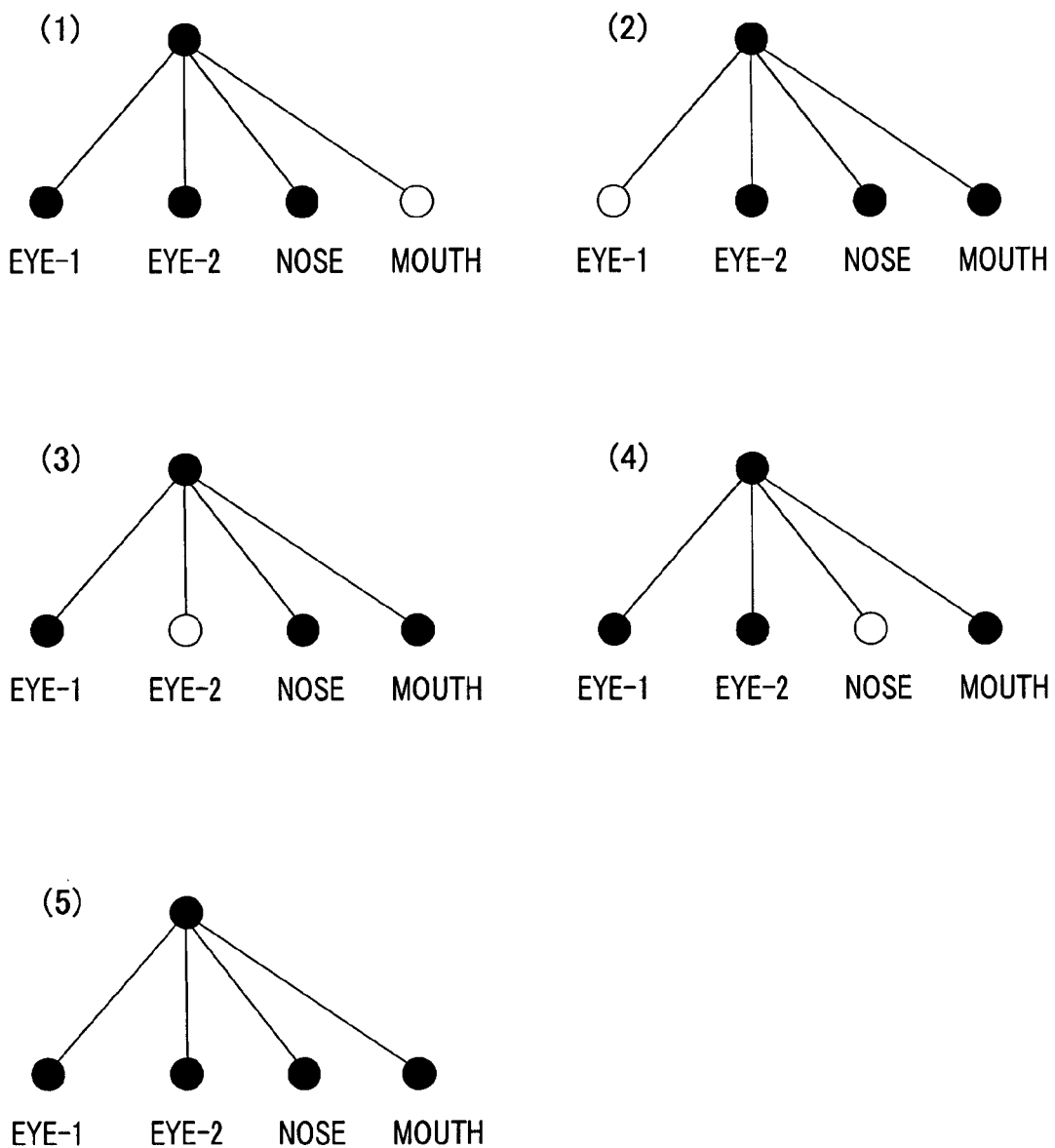
FIG. 25 is a diagram showing examples of list-structured data indicating positional relationships among middle-order features.

The list-structured data is described in further detail below. As shown in FIG. 25, the list-structured data includes data associated with middle-order patterns included in a high-order pattern, wherein the data associated with the middle-order patterns are linked with each other.

In the example shown in FIG. 25, it is assumed that the category of a high-order pattern is a face, and categories of middle-order patterns to be detected are eye", "nose", and "mouth". Each middle-order pattern is also given in the form of list-structured (tree-structured) data of low-order patterns.

This data structure includes no information associated with spatial locations of middle-order patterns, because synapses in the hierarchical neural network shown in FIG. 14 are coupled such that each feature detection layer is capable of detecting the presence, in a preceding feature consolidation layer, of a plurality of local feature elements that satisfy a pre-learned spatial location condition (U.S. patent application Ser. No. 2002-0038294). That is, if there are local feature elements that satisfy a predicted spatial location condition, detection signals (pulse signals) of the respective local feature elements are input to a neuron in a feature detection layer at predetermined intervals of time, and thus the neuron in the feature detection layer does not need data indicating the spatial locations of the feature elements.

In FIG. 20, solid circles denote already-detected middle-order features that are needed to detect a "face", and open circles denote undetected middle-order features. In the examples shown in FIG. 20, at least three middle-order features are needed to detect the face.

Eighth Embodiment

Figure 26:
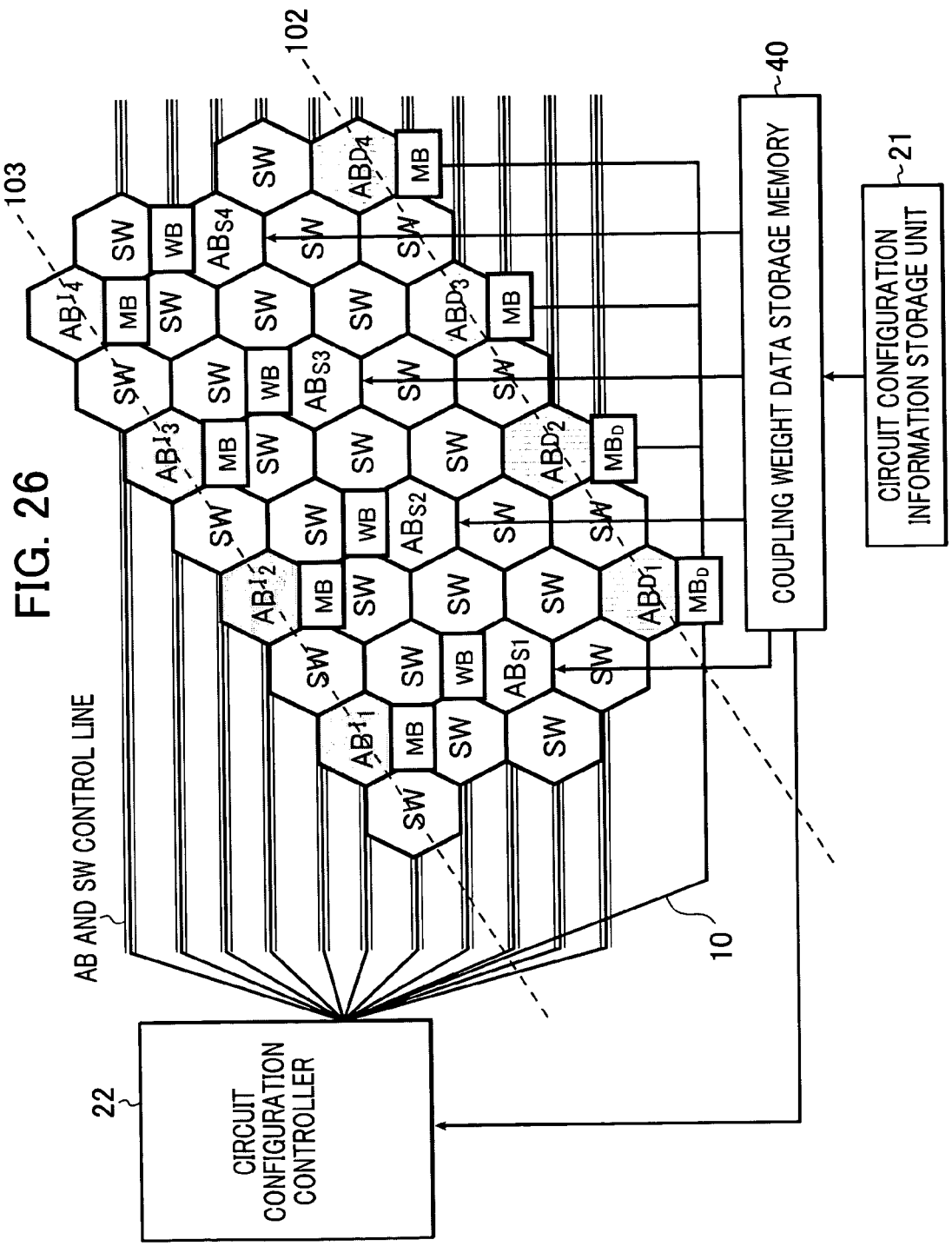
FIG. 26 is a diagram showing main parts of a processing circuit.

FIG. 26 shows main parts of an eight embodiment of the present invention. In this embodiment, a calculation parameter control data memory 40 for storing coupling weight data used as calculation parameter control data is disposed separately from a reconfigurable processing circuit 3, and the reconfigurable processing circuit 3 includes no calculation parameter control data memory. Also in this embodiment, as in the first and second embodiment described above, intermediate result data is fed back via intermediate result memory blocks MB disposed at distributed locations. For example, in FIG. 26, an output from an analog processing block $AB^{Dk}$ is stored in an adjacent memory block $MB_D$. The stored data is then read and input to an analog processing block $AB^{Ik}$ via a feedback line 10. By reconfiguring the circuit each time the hierarchical level is increased, it is possible to realize the hierarchical parallel circuit shown in FIG. 14, using the circuit including only two physical layers. The memory 40 may be a SRAM or a FeRAM. In the case in which a FeRAM is used, it may be of the analog type or of the digital type. Each memory block MB is configured in a similar manner as in the previous embodiment.

Only one feature class (a category or a size of a feature) is detected at a time by each feature detection layer, and the feature class to be detected is time-sequentially changed by the circuit configuration controller 2.

That is, in the reconfigurable processing circuit 3 for pattern recognition, pattern recognition processing is performed in a hierarchical manner in which intermediate result data of a pattern of a particular category at each sampling point of the input data is stored into the intermediate result memory MB, and the category is varied time-sequentially. The circuit configuration controller 2 reads the detection result data (detected by neuron elements $AB^D$ in each feature detection layer 102 and stored in the intermediate result memory MB) from the intermediate result memory MB and supplies the read data to the respective neuron elements ($AB^I$) in the feature consolidation layer 103. Furthermore, the circuit configuration controller 2 sets the on/off-state pattern of switch blocks SW and sets the parameters of the analog processing blocks AB, in accordance with the circuit configuration information read from the circuit configuration information storage unit 1.

In the reconfigurable processing circuit 3, as in the first embodiment, detection of patterns of various orders from the lowest order to the highest order is performed in a hierarchical manner by feature detection layers 102 and feature consolidation layers 103 that are disposed in a cascade fashion (FIG. 14). In the present embodiment, the hierarchical structure of the feature detection layers 102 and the feature consolidation layers 103 is virtually realized by performing processing time-sequentially. This allows a great reduction in the total circuit complexity.

The outputs from each feature detection layer 102 are subjected to sub-sampling as in the first embodiment in the feature consolidation layer 103 at the following stage and temporarily stored in the memory blocks MB. Thereafter, the synapse weights (local receptive field structure) of the feature detection layer 102 are changed, and the intermediate detection results associated with respective feature classes are time-sequentially input from the memory blocks MB to the feature detection layer 102.

For example, when a pattern (middle-order pattern) of an eye is detected in the feature detection layer 102, the local receptive field structure in the feature detection layer 102 is changed so as to time-sequentially have local receptive field structures corresponding to low-order patterns $P_1, P_2, \ldots, P_n$ in synchronization with inputting of detection data corresponding to the respective low-order patterns Pk (k=1, ..., n) (output from the feature detection layer and stored in the intermediate result memory MB) from the intermediate result memory MB. Although the receptive field structure of each neurons in the feature detection layer is changed depending on the feature class, the receptive field structure of each neuron in the feature consolidation layer is not changed if the receptive field size of the feature class is maintained unchanged.

The digital data indicating the local receptive field structures corresponding to the respective feature classes is stored in the circuit configuration information storage unit 1. The data is read from the circuit configuration information storage unit 1, and the local receptive field structure is changed according to a control signal output from the circuit configuration controller 2.

For example, the receptive field structure of neurons of the feature detection layer 102, which is set so as to detect an eye pattern (middle-order feature) at a certain time, is time-sequentially changed in a predetermined order set so as to detect a nose pattern and a mouth pattern in accordance with the control signal output from the circuit configuration controller 2.

As described above, when input data is given, a plurality of different features are detected (recognized) by performing time-division multiprocessing using the same reconfigurable processing circuit 3. This allows a great reduction in circuit complexity compared with a circuit needed to detect different features separately and parallel at the same time at sampling positions of the input data.

The receptive field structure is time-sequentially changed under the control of the circuit configuration controller 2 in accordance with the circuit configuration data stored in the circuit configuration information storage unit 1 formed of a SRAM (or a MRAM or a FRAM) wherein the circuit configuration controller 2 and the circuit configuration data are constructed in the form of a reconfigurable analog/digital hybrid circuit.

To realize a hierarchical neural network including neurons having a local receptive field structure such as that shown in FIG. 14, a circuit configuration controller and a storage unit are generally necessary in each of layers to change the local receptive field structure in accordance with circuit configuration information for each of layers. However, in the present embodiment, only one set of the circuit configuration information storage unit 1 and the circuit configuration controller 2 is sufficient for the above purpose regardless of how many layers the hierarchical structure has.

That is, in a case in which the feature detection layer 102 needs to detect one feature class (a feature category and a size thereof) at each sampling point of in input data at a time, the local receptive field structures of neurons of the feature detection layer are identical. Therefore, the circuit configuration information storage unit 1 and the circuit configuration controller 2 can be used in common to determine the receptive field structures by time-sequentially controlling the switch blocks SB and the analog processing blocks ABs in accordance with the circuit configuration information.

The weighting factor of each coupling depending on the receptive field structure can be set and changed by changing the synapse weight data of the analog processing blocks $AB_S$ in accordance with the weighting factor data supplied from the memory 40.

For example, when the synapse weight is given by the amount of a charge injected and stored in a floating gate element in the analog processing block $AB_S$, each synapse weight can be set by injecting as much charge as corresponding to a weighting factor stored in the memory 40, via an analog processing block control line shown in FIG. 14.

Although the present invention has been described in its preferred form with a certain degree of particularity, many apparently widely different embodiments of the invention can be made without departing from the spirit and the scope thereof. It is to be understood that the invention is not limited to the specific embodiments thereof except as defined in the appended claims.

What is claimed is:

1. A hierarchical processing apparatus comprising:
   data input means for time-sequentially inputting pattern data in a particular hierarchical level;
   a calculation parameter control data memory for storing calculation parameter control data;
   detection means for detecting a particular feature from pattern data, using the calculation parameter control data;
   an intermediate result memory for storing intermediate data output from the detection means; and
   control means for controlling a flow of data depending on the hierarchical level of processing such that an input acquired via the data input means or an intermediate result fed back from the intermediate result memory and calculation parameter control data read from the calculation parameter control data memory are supplied to the detection means.

2. A hierarchical processing apparatus according to claim 1, wherein the detection means outputs an analog signal, and the intermediate result memory is a volatile analog memory.

3. A hierarchical processing apparatus according to claim 1, wherein the detection means outputs an analog signal, and the intermediate result memory is a nonvolatile analog memory.

4. A hierarchical processing apparatus according to claim 1, further comprising calculation parameter change means for time-sequentially changing the calculation parameter.

5. A hierarchical processing apparatus according to claim 1, wherein the detection means extracts a particular local feature at respective locations in the data.

6. A hierarchical processing apparatus according to claim 1, wherein the detection means is parallel processing means including a plurality of operation elements disposed in parallel and coupled with each other.

7. A hierarchical processing apparatus according to claim 1, wherein the intermediate result memory includes a ferroelectric.

8. A hierarchical processing apparatus according to claim 1, further comprising conversion means for converting a signal output from the detection means into a digital signal, wherein the intermediate result memory is a digital memory for storing the digital signal.

9. A hierarchical processing apparatus according to claim 8, wherein the digital memory is a ferroelectric memory.

10. A hierarchical processing apparatus according to claim 1, wherein the control means controls the flow of data such that the input acquired via the data input means or the intermediate result read from the intermediate result memory and calculation parameter control data read from the calculation parameter control data memory are supplied to the detection means with the same timing.

11. A hierarchical processing apparatus according to claim 1, wherein the detection means includes a plurality of sets of a feature detection layer and a feature consolidation layer that are cascade-connected.

12. A hierarchical processing apparatus according to claim 1, wherein the control means reads the calculation control data from the calculation parameter control data memory and controls calculation parameters of the detection means in accordance with the calculation control data so that features corresponding to a plurality of different categories or sizes are detected from the input pattern data.

13. A hierarchical processing apparatus comprising:
data input means for inputting local data by scanning pattern data in a particular hierarchical level;
first detection means for detecting a local feature from the pattern data;
scanning position change means for changing a scanning position of the data input means in accordance with the class of the local feature;
second detection means for detecting, from a plurality of local features detected at different scanning positions, the presence/absence of a feature of a higher order than the order of the detected local features;
an intermediate result memory for temporarily storing data output from the second detection means; and
coupling means for feeding back a signal output from the intermediate result memory to the first detection means.

14. A signal processor comprising:
a processing circuit;
circuit configuration information storage means for storing circuit configuration information; and
circuit configuration control means for outputting a control signal to the processing circuit in accordance with the circuit configuration information read from the circuit configuration information storage means;
wherein the processing circuit comprises
a plurality of analog processing blocks for modulating an input signal;
a plurality of intermediate result memory blocks for temporarily storing signals output from the plurality of analog processing blocks;
a plurality of calculation parameter control data memory blocks for storing data used to control calculation parameters associated with the plurality of analog processing blocks; and
a plurality of signal lines for connections among the plurality of intermediate result memory block and/or the plurality of analog processing blocks;
whereby the circuit configuration control means controls reading of data from the calculation parameter control data memory block such that the processing circuit performs signal processing differently depending on the data read from the calculation parameter control data memory block.

15. A signal processor according to claim 14, wherein each analog processing block includes modulation means for modulating an input signal and a branch circuit for outputting a signal via a selected output terminal.

16. A signal processor according to claim 14, wherein each analog processing block determines the sum or the integral of input signals weighted by factors varying with time.

17. A signal processor according to claim 14, wherein each analog processing block includes a plurality of modulators for modulating input signals by amounts that can be different from each other.

18. A signal processor according to claim 17, wherein each input signal modulator is a circuit for modulating the delay or phase of a pulse signal.

19. A signal processor comprising:
a processing circuit;
circuit configuration information storage means for storing circuit configuration information associated with the processing circuit and also storing data used to control the calculation parameter thereof;
circuit configuration control means for outputting a control signal to the processing circuit in accordance with the circuit configuration information and the calculation parameter control data read from the circuit configuration information storage means;
wherein the processing circuit includes a plurality of switch blocks, a plurality of first-type analog processing blocks, a plurality of second-type analog processing blocks, and an intermediate result memory block for storing outputs of the second-type analog processing blocks, those blocks being connected with each other via signal lines with a particular connection pattern;
each first-type analog processing block modulates a signal output from a second-type analog processing block;
each second-type analog processing block consolidates signals input from a plurality of first-type analog processing blocks and outputs a resultant signal;
each switch block includes a plurality of switch elements and a plurality of signal lines; and
the circuit configuration control means controls the on/off-state pattern of the plurality of switch elements or controls the signal modulation parameters associated with the analog processing blocks such that the processing circuit performs signal processing differently depending on the on/off-state pattern or the signal modulation parameters.

20. A signal processor according to claim 19, wherein each switch block receives signals output from a plurality of analog processing blocks via signal lines.

21. A signal processor according to claim 19, wherein each switch block includes a plurality of input/output signal lines and a plurality of switch elements, and each switch block transfers a signal input via a signal line to another signal line.

22. A signal processor according to claim 19, wherein each switch block sets the plurality of switch elements into an on-state or an off-state in accordance with a control signal supplied via a control line.

23. A signal processor according to claim 19, wherein each switch block includes a plurality of signal lines extending in the same direction.

24. A signal processor according to claim 19, wherein each of the first-type analog processing blocks includes modulation means for modulating an input signal, and each of the second-type analog processing blocks performs weighted integration on input signals with respect time.

25. A signal processor comprising:
a processing circuit;
circuit configuration information storage means for storing circuit configuration information and calculation parameter control data; and
circuit configuration control means for outputting a control signal to the processing circuit in accordance with the circuit configuration information and the calculation parameter control data read from the circuit configuration information storage means;
wherein the processing circuit includes a plurality of switch blocks each including a plurality of switch elements and a plurality of signal lines, a plurality of logical processing blocks, a plurality of analog processing blocks for modulating a signal input thereto, a plurality of intermediate result memory blocks for storing one or more signals output from some of the plurality of logical processing blocks or analog processing blocks, those blocks being connected with each other via signal lines; and the circuit configuration control means controls the on/off-state pattern of the plurality of switch elements or controls the amounts of modulation performed by the analog processing blocks such that the processing circuit performs signal processing differently depending on the on/off-state pattern or the amounts of modulation.

26. A signal processor according to claim 25, wherein each logical processing block includes at least one AND circuit having a plurality of inputs.

27. A pattern recognition apparatus comprising:
input means for inputting pattern data;
a processing circuit;
circuit configuration information storage means for storing circuit configuration information; and
circuit configuration control means for outputting a control signal to the processing circuit in accordance with the circuit configuration information read from the circuit configuration information storage means;

wherein the processing circuit includes at least a plurality of switches, a plurality of analog processing blocks, a plurality of intermediate result memory blocks for storing data output from some of the analog processing blocks, and signal lines for connections among the switches and/or analog processing blocks;

the circuit configuration information storage means stores at least one on/off-state pattern of the plurality of switches and one set of signal modulation data associated with the plurality of analog processing blocks; and the circuit configuration control means includes output means that controls the on/off-state pattern of the plurality of switches and supplies particular calculation parameter control data to the plurality of analog processing blocks in accordance with the circuit configuration information read from the circuit configuration information storage means such that a plurality of particular feature categories are detected at a plurality of particular locations from a part or all of the input pattern and the detected feature categories are output.

* * * * *